United States Patent
Weijnen et al.

(10) Patent No.: US 9,145,501 B2
(45) Date of Patent: Sep. 29, 2015

(54) COATING COMPOSITION AND USE THEREOF

(71) Applicant: PPG Europe BV, Uithoorn (NL)

(72) Inventors: John Weijnen, Alphen aan den Rijn (NL); Dirk Klomp, Wormerveer (NL)

(73) Assignee: PPG Europe BV, Amsterdamseweg (NL)

( * ) Notice: Subject to any disclaimer, the term of this patent is extended or adjusted under 35 U.S.C. 154(b) by 0 days.

(21) Appl. No.: 14/347,027

(22) PCT Filed: Sep. 26, 2012

(86) PCT No.: PCT/EP2012/068927
§ 371 (c)(1),
(2) Date: Mar. 25, 2014

(87) PCT Pub. No.: WO2013/045475
PCT Pub. Date: Apr. 4, 2013

(65) Prior Publication Data
US 2014/0221520 A1  Aug. 7, 2014

(30) Foreign Application Priority Data

Sep. 26, 2011 (WO) ................ PCT/EP2011/066683

(51) Int. Cl.
| | |
|---|---|
| *C08F 2/50* | (2006.01) |
| *B29C 71/04* | (2006.01) |
| *A61L 2/08* | (2006.01) |
| *A61L 24/00* | (2006.01) |
| *C08F 2/46* | (2006.01) |
| *C08G 61/04* | (2006.01) |
| *C09D 7/12* | (2006.01) |
| *C09D 167/07* | (2006.01) |
| *C08K 5/00* | (2006.01) |
| *C08K 5/16* | (2006.01) |

(52) U.S. Cl.
CPC ............ *C09D 7/1233* (2013.01); *C09D 167/07* (2013.01); *C08K 5/0091* (2013.01); *C08K 5/16* (2013.01)

(58) Field of Classification Search
CPC .. C09D 7/1233; C09D 167/07; C08K 5/0091; C08K 5/16
USPC ................... 522/64, 6, 71, 189, 184, 1; 520/1
See application file for complete search history.

(56) References Cited

U.S. PATENT DOCUMENTS

| 4,591,518 A | * | 5/1986 | Schillinger et al. ........ 427/385.5 |
|---|---|---|---|
| 5,039,740 A | | 8/1991 | Anderson et al. |
| 7,351,475 B2 | * | 4/2008 | Dean et al. .................... 428/407 |
| 2004/0059032 A1 | * | 3/2004 | He ................................. 524/284 |
| 2004/0151931 A1 | | 8/2004 | Dean et al. |
| 2006/0035099 A1 | | 2/2006 | Dean et al. |
| 2009/0253833 A1 | * | 10/2009 | Hage et al. ...................... 524/91 |

FOREIGN PATENT DOCUMENTS

| EP | 2175000 A1 | 4/2010 |
|---|---|---|
| EP | 2038356 B1 | 8/2010 |
| WO | 03093384 A1 | 11/2003 |
| WO | 2004101639 | 11/2004 |
| WO | 2006020818 A2 | 2/2006 |
| WO | 2010054461 A1 | 5/2010 |
| WO | 2012163999 A1 | 12/2012 |

OTHER PUBLICATIONS

Oyman et al, A promising environmentally-friendly manganese-based catalyst for alkyd emulsion coatings, Sep. 11, 2004, Polymer, 45, 7431-7436.*

* cited by examiner

Primary Examiner — Ling Choi
Assistant Examiner — Jessica E Whiteley
(74) Attorney, Agent, or Firm — Krisanne Shideler

(57) ABSTRACT

The invention relates to composition comprising at least one modified alkyd binder, selected from a (meth)acrylate modified alkyd binder and a vinyl modified alkyd binder, wherein the (meth)acrylate modified alkyd and the vinyl modified alkyd binder comprise at least one —C(R100)=CH2 group, wherein R100 is hydrogen or methyl; and at least one metal complex comprising a metal or a metal salt of an organic acid or inorganic anion and at least one ligand, wherein the metal is selected from Fe and Mn, and wherein said at least one ligand is a nitrogen donor ligand, selected from the group comprising monodentate, bidentate, tridentate, tetradentate, pentadentate and hexadentate nitrogen donor ligands.

15 Claims, No Drawings

COATING COMPOSITION AND USE THEREOF

FIELD OF THE INVENTION

The invention relates to a composition, comprising an alkyd binder and a metal complex.

BACKGROUND OF THE INVENTION

Alkyd resins are one of the most ubiquitous binders used for ambient-cure, solvent-based coatings. The mechanical and chemical resistance properties of traditional solvent-borne alkyd resins are developed via autooxidative crosslinking of the alkyd film. Alkyd resins can be prepared by the esterification or transesterification of polybasic organic acids or anhydrides, polyhydric alcohols and unsaturated fatty acids or the corresponding oils. The types and relative amounts of the alkyd components largely determine the physical properties of the paint or coating film which the resin forms. Crosslinking occurs when the activated methylene groups in the unsaturated fatty acids or oils of the alkyd are oxidized in air to the corresponding hydroperoxides which subsequently decompose to generate free radicals, thus resulting in an oxidative crosslinking process.

Because of the high molecular weight, the architectural structure and the presence of hydrogen bond forming and accepting functionalities, the intrinsic alkyd viscosity is relatively high and consequently cutting solvents are required to obtain a practical processing viscosity. Traditional liquid alkyd paints contain as much as 30 wt % or more of volatile organic solvent which is usually a hydrocarbon liquid such as white spirit, hydrogenated and low aromatic white spirit. Typically, volatile organic compounds (VOC's) have a boiling point of up to 250° C. measured at a pressure of 101.3 kPa. The environmental burden and the health problems caused by solvent emission impose the development of high solids or even solvent free coatings. The directory 2004/42/EG of the European Parliament sets limits to the maximum concentration of VOC's in categorized paints and varnishes and vehicle refinishing products. The regulatory restrictions have induced research towards new technologies directed at reducing VOC content of coating technologies in a variety of industries.

WO2008/101722 discloses grafted autoxidisable polyester resins showing low viscosities at relatively high average molecular weight, which are highly advantageous in high solid coating formulations. WO2009/062996 describes an autoxidisable coating composition comprising an autoxidisable alkyd resin and an autoxidisable material, wherein said components have a specific molecular weight distribution, which has favorable properties even for high average molecular weights. EP1608694 is related to a method for the preparation of high solids urethane alkyds. WO2007/074333 discloses a coating composition comprising an alkyd resin and a reactive diluent. The reactive diluent is obtained by reacting a polyunsaturated fatty acid with a dicarboxylic acid and a polyol. WO2007/113146 relates to a coating composition comprising an oxidatively drying binder and a reactive diluent. The diluent is an ester of a polyunsaturated alcohol, which can be selected from the group comprising geraniol, nerol, citronellol, and farnesol.

However, while the move to reduced organic solvent-based compositions brings health and safety benefits, these lower VOC coating compositions must still meet or exceed the performance standards expected from solvent-based compositions. Coating compositions with a low content of volatile organic compounds exhibit considerable shortcomings as low rate of drying at temperatures below 30° C., excessive brush drag, more sensitive to forming a film of a patterned appearance ('wrinkling'), less satisfactory yellowing resistance and impeded hardness development. Modifications have been made to alkyd resins in an attempt to address such concerns. Alkyd resins have been developed that next to autoxidative curing also may crosslink at ambient temperature by a second crosslinking mechanism. Such secondary curing mechanisms may be ensured by providing the autoxidisable alkyd resin with functional groups that may impart further crosslinking, resulting in an even faster drying process of the coating composition. The functional groups may be attached to the alkyd resin by means of any well-known reactions.

The oxidative crosslinking process is usually accelerated by adding driers. The most widely used driers are cobalt carboxylates because of their good drying performance at ambient temperature and coloristic properties. However, recent studies have shown that several cobalt carboxylates including cobalt octoate are considered as very toxic to aquatic organisms and there are indications that cobalt carboxylates may induce carcinogenic effects by inhalation as by analogy with the more water soluble inorganic salts such as cobalt sulfate and chloride. Hence there is an increasing demand for alternative, non-cobalt based driers.

None of the cobalt-free drier systems disclosed in the art has, however, reached or exceeded the performance of the conventional cobalt containing driers under conditions of low temperatures and regarding through hardening in coating compositions. There is still a need to provide cobalt-free alkyd resin systems having a markedly reduced solvent content or being solvent free and showing a similar or improved drying performance. However, the curing agents based on alternative complexes do not show a comparable drying activity to cobalt salts under conditions of low temperatures or do not show a comparable activity with regards to through hardening.

Thus, there exists a need to improve the drying performance of non-cobalt or low-cobalt coating compositions. Furthermore, there exists a need for coating compositions which provide faster drying properties than cobalt-comprising coating compositions. Furthermore, there exists a need for coating compositions which provide fast drying properties under adverse conditions, such as at low temperatures and in the dark.

SUMMARY OF THE INVENTION

The inventors have surprisingly found that effective drying of compositions comprising autoxidisable alkyd resins containing pendant free radical curable moieties can be achieved by using specific iron- and manganese-ligand complexes as drying accelerator and can even result in drying times that are shorter than those with cobalt-based driers such as cobalt carboxylates. Even for adverse drying conditions, a significant reduction in drying time was surprisingly observed. The present invention provides alkyd-based coating compositions that comprise the aforementioned drier complexes.

According to a first aspect, the present invention relates to a composition, comprising:

(a) at least one modified alkyd binder selected from a (meth)acrylate modified alkyd binder or a vinyl modified alkyd binder; and (b) at least one metal complex comprising a metal or a metal salt of an organic acid or inorganic anion and at least one ligand, wherein the metal is selected from Fe and Mn, preferably wherein the metal is Fe, and wherein said at least one ligand is a nitrogen donor ligand, selected from the group comprising monodentate, bidentate, tridentate, tetradentate, pentadentate and hexadentate nitrogen donor ligands.

Preferably, the present invention relates to a composition, comprising:

(a) at least one modified alkyd binder selected from a (meth)acrylate modified alkyd binder or a vinyl modified alkyd binder, wherein the (meth)acrylate modified alkyd and the vinyl modified alkyd binder comprises at least one —C($R^{100}$)=$CH_2$ group, wherein $R^{100}$ is hydrogen or methyl; and (b) at least one metal complex comprising a metal or a metal salt of an organic acid or inorganic anion and at least one ligand, wherein the metal is selected from Fe and Mn, preferably wherein the metal is Fe, and wherein said at least one ligand is a nitrogen donor ligand, selected from the group comprising monodentate, bidentate, tridentate, tetradentate, pentadentate and hexadentate nitrogen donor ligands.

According to a second aspect, the present invention also relates to use of the composition according to the first aspect of the present invention in a coating, varnish, lacquer, paint, stain, enamel, printing ink or floor covering. According to a third aspect, the present invention also relates to a substrate having applied thereon a composition according to the first aspect of the present invention.

Preferred embodiments of the invention are disclosed in the detailed description and appended claims. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

DETAILED DESCRIPTION OF THE INVENTION

When describing the compositions of the invention, the terms used are to be construed in accordance with the following definitions, unless a context dictates otherwise.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

As used in the specification and the appended claims, the singular forms "a", "an," and "the" include plural referents unless the context clearly dictates otherwise. By way of example, "a binder" means one binder or more than one binder.

Unless defined otherwise, all technical and scientific terms used herein have the same meaning as is commonly understood by one of skill in the art. All publications referenced herein are incorporated by reference thereto.

Throughout this application, the term 'about' is used to indicate that a value includes the standard deviation of error for the device or method being employed to determine the value.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

According to a first aspect, the present invention relates to a composition, comprising:

(a) at least one modified alkyd binder, selected from a (meth)acrylate modified alkyd binder and a vinyl modified alkyd binder; and (b) at least one metal complex comprising a metal or a metal salt of an organic acid or an inorganic anion and at least one ligand, wherein the metal is selected from Fe and Mn, preferably wherein the metal is Fe, and wherein said at least one ligand is a nitrogen donor ligand, selected from the group comprising monodentate, bidentate, tridentate, tetradentate, pentadentate and hexadentate nitrogen donor ligands.

In an embodiment, the modified alkyd binder is a modified alkyd binder which comprises one or more —C($R^{100}$)=$CH_2$ groups, wherein $R^{100}$ is hydrogen or methyl.

In a preferred embodiment, the at least one alkyd binder is a (meth)acrylate modified alkyd binder. In an embodiment, the modified alkyd binder is a (meth)acrylate modified alkyd binder which comprises one or more —C($R^{100}$)=$CH_2$ groups, wherein $R^{100}$ is hydrogen or methyl.

As used herein, the term "(meth)acrylate" or "acrylate" are used interchangeably and refers to a group which comprises at least one acrylate ($H_2C$=CH—C(=O)—O—) or methacrylate ($H_2C$=C($CH_3$)—C(=O)—O—) group, and thus encompasses both acrylates and methacrylates.

As used herein the terms "(meth)acrylate modified alkyd binder" or "(meth)acrylate-functional alkyd binder" are used interchangeably and refer to the reaction product of an alkyd with a reactant having at least one (meth)acrylic moiety.

In a preferred embodiment, the at least one alkyd binder is a vinyl modified alkyd binder. In an embodiment, the modified alkyd binder is a vinyl modified alkyd binder which comprises one or more —C($R^{100}$)=$CH_2$ groups, wherein $R^{100}$ is hydrogen.

As used herein, the term "vinyl" refers to a group which comprises at least one vinyl (—HC=$CH_2$) functionality.

In an embodiment, the vinyl modified alkyd binder is an allyl modified alkyd binder. As used herein, the term "allyl" refers to a group which comprises at least one allyl (—$CH_2$—CH=$CH_2$) functionality.

For example, the vinyl modified alkyd binder may be a reaction product of an alkyd with a reactant having at least one vinyl moiety. Preferably, the term "vinyl modified alkyd binder" refers to modified alkyd binders with one or more pendant ethylenically unsaturated —HC=$CH_2$ groups. In an embodiment, the vinyl modified alkyd binder is a reaction product of an alkyd with a reactant having at least one vinyl moiety, preferably wherein the reaction product comprises at least one ethylenically unsaturated group. Preferably, the reactant is a hydroxyalkylvinyl ether such as 2-hydroxyethyl vinyl ether, 3-hydroxypropyl vinyl ether and 4-hydroxybutyl vinyl ether.

In an embodiment, the vinyl modified alkyd binder is a reaction product of an alkyd with a hydroxyalkylvinyl ether selected from the group comprising: 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, 6-hydroxyhexyl vinyl ether, diethyleneglycol monovinyl ether, polyethylene glycol monovinyl ether, 1,4-cyclohexanedimethanol monovinyl ether, 2-hydroxyethyl allyl ether, 2-hydroxy-1-methylethyl allyl ether, 2-hydroxypropyl allyl ether, 4-hydroxybutyl allyl ether, diethylene glycol monoallyl ether, 2-hydroxy-2-chloromethyl ethyl allyl ether, trimethylolpropane monoallyl or diallyl ether, glycerol monoallyl or diallyl ether, pentaerythritol monoallyl, diallyl or triallyl ether, and mixtures thereof.

In an embodiment, the vinyl modified alkyd binder is a reaction product of an alkyd with a hydroxyalkylvinyl ether selected from the group comprising: 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, 6-hydroxyhexyl vinyl ether, diethyleneglycol monovinyl ether, polyethylene glycol monovinyl ether, 1,4-cyclohexanedimethanol monovinyl ether, and mixtures thereof.

The present invention encompasses the use of alkyd modified with an acrylic or vinyl monomer in which the double bond of these monomers is intact.

As used herein, the terms "modified alkyd binder" or "modified alkyd resin" are used interchangeably. Preferably the modified alkyd binder is an autoxidizable alkyd binder. Suitable alkyd for use are in general the reaction product of the esterification of polyhydric alcohols with polybasic acids (or their anhydrides) and unsaturated fatty acids (or glycerol esters thereof), for example derived from linseed oil, tung oil, tall oil as well as from other drying or semi-drying oils. Alkyds are well-known in the art and need not to be further described herein. The properties are primarily determined by the nature and the ratios of the alcohols and acids used and by the degree of condensation. Suitable alkyds include long oil, very long oil and medium oil alkyd resins e.g. derived from 45 to 85 wt % of fatty acids, preferably derived from 45 to 70 wt % of fatty acids. As used herein, the term "long oil alkyd" refers to alkyd with an oil content of between 60 and 75 wt %, and a fatty acid content of 57 to 70 wt %. As used herein, the term "medium oil alkyd" refers to alkyd with an oil content of between 45 wt % and 60 wt %, and a fatty acid content of 42 to 57 wt %. As used herein, the term "very long oil alkyd" refers to alkyd with an oil content of between 75 and 85 wt %, and a fatty acid content of 70 to 80 wt %. In an embodiment, the alkyd is a medium oil alkyd. In another embodiment, the alkyd is a long oil alkyd. In another embodiment, the alkyd is a very long oil alkyd.

Suitable acrylate-functionalized alkyd resin can be prepared for example by reaction of an alkyd with a high carboxyl number and glycidyl methacrylate (GMA), for example, as described in JP48085628, which is hereby incorporated by reference. Suitable acrylate-functionalized alkyd resin can also be prepared via the synthesis of an alkyd with a high OH-functionality followed by esterification with a di- or triacid, for example trimellitic acid or trimellitic anhydride (TMA), and coupling of the resulting alkyd with high carboxyl functionality with GMA, for example as described in WO0100741, which is hereby incorporated by reference. Suitable acrylate-functionalized alkyd resin can also be prepared by the coupling of an alkyd with a high OH-functionality with a hydroxyl(meth)acrylate via a diisocyanate, for example as described in US20040151931, which is hereby incorporated by reference.

Suitable vinyl modified alkyd may be prepared by reacting an alkyd with a vinyl-containing monomer, for example as described in US20040151931, which is hereby incorporated by reference.

Other methods or sources of acrylate, methacrylate, and vinyl functionality are also suitable according to the invention to modify the alkyd. Thus, an epoxide group can be used in the acrylate or vinyl monomer, as means for appending the acrylate or vinyl group to the alkyd resin. The coupling of an epoxide functionalized acrylic or vinyl monomer to an alkyd preserves the acrylate or vinyl functionality. Suitable acrylates include acrylate esters such as tert-butyl acrylate, tert-butyl methacrylate, methyl acrylate, methyl methacrylate, 2-hydroxyethyl acrylate, 2-hydroxyethyl methacrylate, butyl acrylate, butyl methacrylate, 4-hydroxybutyl acrylate glycidyl ether, and the like. Suitable allylic compounds include allyl glycidyl ether, epoxybutene, suitable vinyl compounds include 2-hydroxyethyl vinyl ether, 3-hydroxypropyl vinyl ether and 4-hydroxybutyl vinyl ether and suitable isocyantefunctional ethylenically unsaturated compounds include 3-isopropenyl-alpha,alpha-dimethylbenzyl isocyanate, 2-isocyanatoethyl methacrylate and the like. Preferably, acrylic monomers used in the invention are epoxy functionalized such as GMA, isocyanate functionalized or hydroxyl functionalized.

Non-limiting examples of representative reactants include: acrylic acid, methacrylic acid, and (meth)acrylates of monohydric alcohols, and similar (meth)acrylate acid derivatives, such as methyl methacrylate, 2-ethylhexyl acrylate, n-butyl acrylate and lauryl methacrylate. Acrylic anhydride, methacrylic anhydride, and the acid chlorides of acrylic or methacrylic based acids are also practical. Useful epoxy functional monomers include glycidyl(meth)acrylates. Useful hydroxyl functional monomers include 2-hydroxyethyl acrylate, 2-hydroxyethyl methacrylate, 2-hydroxypropyl acrylate, 4-hydroxybutyl methacrylate, 2-hydroxypropyl methacrylate, 3-hydroxybutyl acrylate, 4-hydroxypentyl acrylate, 3-hydroxybutyl methacrylate, 2-hydroxyethyl chloroacrylate, diethylene glycol methacrylate, tetraethylene glycol acrylate, and caprolactone adducts with 1 to 5 caprolactone units. Non-limiting examples of isocyanate functional (meth)acrylates can be found in US20040151931 paragraph 0017, which is hereby incorporated by reference. Non-limiting examples of suitable acrylate modified alkyd resins, and their synthesis, are described in patent applications JP48085628, US20040151931, and WO0100741, which are hereby incorporated by reference.

In a preferred embodiment, the acrylate-functionalized alkyd resin comprises the reaction product of (i) an alkyd resin and (ii) a glycidyl acrylate, the glycidyl moiety of the glycidyl acrylate being the reactive moiety to functionalize the alkyd resin. The resulting reaction product contains pendant reactive acrylate moieties. An acrylate modified alkyd resin may alternatively comprise the reaction product of (a) an alkyd resin, (b) an acid anhydride, and (c) an acrylate, preferably a glycidyl acrylate. The hydroxyl end groups of the alkyd are converted to acid end groups by reaction of the alkyd resin with a di- or triacid anhydride to produce a carboxyl-functional resin, which in turn is then reacted with the glycidyl acrylate. In a preferred embodiment, the acrylate-functionalized alkyd resin, comprises the reaction product of (i) an alkyd resin and (ii) glycidyl methacrylate (GMA).

In a preferred embodiment, an isocyanate-functional ethylenically unsaturated compound is reacted with the alkyd to form a urethane modified alkyd resin having pendant polymerizable groups. Suitable isocyanates are any known isocyanates that, when reacted with the hydroxyl containing alkyd resin, form a urethane modified alkyd resin having pendant polymerizable ethylenic unsaturation.

The amount of (meth)acrylate or vinyl modified alkyd binder, preferably a (meth)acrylate modified alkyd binder, in the present compositions can typically range from about 20 to 98 wt %, such as about 30 to about 90 wt %, preferably about 35 to 70 wt %, for example between 40 and 60 wt % based on the total weight of the composition.

In some embodiments, the present composition can further comprise at least one additional alkyd binder comprising a medium oil alkyd binder, a long oil alkyd binder, a very long oil alkyd binder, or a combination thereof. Suitable alkyds have been described herein above. Preferably, the composition comprises at least one (meth)acrylate or vinyl modified alkyd binder, preferably a (meth)acrylate modified alkyd binder, and at least one medium or long or very long oil alkyd binder. In a more preferred embodiment of the present invention, the composition comprises at least one (meth)acrylate or vinyl modified alkyd binder, preferably a (meth)acrylate modified alkyd binder, and at least one long oil alkyd binder.

The amount of additional alkyd binder in the present compositions can typically range from about 1 to 80 wt %, such as about 2 to about 50 wt %, preferably about 3 to 20 wt % based on the total weight of the composition, more preferably between 5 and 10 wt % based on the total weight of the composition.

In an embodiment of the present invention, the coating composition comprises at least 10 wt %, preferably at least 20 wt %, of the at least one long oil, very long oil or medium oil alkyd binder, with weight percentage being based on the total weight of the composition. In an embodiment of the present invention, the coating composition comprises at least 5 wt %, preferably at least 10 wt %, more preferably at least 12 wt % of the at least one urethane modified alkyd binder, with weight percentage being based on the total weight of the composition.

In a preferred embodiment of the present invention, the (meth)acrylate or vinyl modified alkyd binder, preferably a (meth)acrylate modified alkyd binder, has a solids content of at least 50%, preferably at least 55%, more preferably at least 60% yet more preferably at least 65%, yet more preferably at least 70%, whereby the solids content is defined as non-volatile solids content or non-volatile matter or nvm. As used herein, the term "solids content" refers to the proportion of non-volatile material contained in an adhesive, coating, ink, paint, or other suspension. It is the material left after the volatile solvent (which serves as a carrier or vehicle for the solid content) has vaporized. The solids content may be determined by evaporating to dryness a weighed sample of solution and determining the percent residue. The solids content can be measured as described in ISO3251.

The composition according to the invention comprises at least one metal or metal salt of an organic acid or inorganic anion selected from an iron (Fe) or manganese (Mn) complex of a monodentate, bidentate, tridentate, tetradentate, pentadentate or hexadentate nitrogen donor ligand or an iron (Fe) or manganese (Mn) metal salt of an organic acid or inorganic anion of a monodentate, bidentate, tridentate, tetradentate, pentadentate or hexadentate nitrogen donor ligand.

In an embodiment, the metal is Mn. In another preferred embodiment the metal is Fe. In an embodiment, the at least one metal complex comprises a metal and at least one ligand as described above. In another embodiment, the at least one metal complex comprises a metal salt of an organic acid or inorganic anion and at least one ligand as described above.

In an embodiment, the inorganic anion can be selected from one or more of chloride (Cr), tetrafluoroborate (BF4−), hexafluorophosphate (PF6−).

Preferably, the organic acid of the metal salt of an organic acid is selected from branched-chain or straight-chain saturated and unsaturated aliphatic, aromatic and alicyclic monocarboxylic acids having 3 to 22 carbon atoms, cycloaliphatic monocarboxylic acids having 4 to 10 carbon atoms, or mixtures of these acids. Preferably the organic acid is selected from the group comprising: 2-ethylbutanoic acid, 2,2-dimethylpentanoic acid, 2-ethylpentanoic acid, 2-ethyl-4-methylpentanoic acid, 2-ethylhexanoic acid, isooctanoic acid, isononanoic acid, neononanoic acid, nonanoic acid, isodecanoic acid, neodecanoic acid, 2-ethyldecanoic acid, isotridecanoic acid, isotetradecanoic acid, n-hexanoic acid, n-octanoic acid, n-decanoic acid, n-dodecanoic acid, cyclopentanoic acid, methylcyclopentanoic acid, cyclohexanoic acid, methylcyclohexanoic acid, 1,2-dimethylcyclohexanoic acid, cycloheptanoic acid, myristic acid, stearic acid, arachidic acid, behenic acid, oleic acid, linoleic acid, tall oil fatty acid, erucic acid, p-tert-butylbenzoic acid, monobutyl maleate, monodecyl phthalate, naphthenic acid and mixtures thereof. Particularly preferred acids include 2-ethylhexanoic acid, isononanoic acid, isodecanoic acid, and mixtures thereof. Preferably the metal salt of an organic acid is selected from the group comprising metal-octoate, metal-naphthenate and metal-neodecanoate. More preferably, said metal salt of an organic acid is metal-octoate. In an embodiment, the metal salt of an organic acid is Mn octoate.

Preferably, the at least one metal complex is a Fe or Mn complex of a bidentate, tridentate, tetradentate, pentadentate or hexadentate nitrogen donor ligand. Preferably the nitrogen donor ligand is a tridentate, tetradentate or pentadentate nitrogen donor ligand. More preferably the iron complex comprises a pentadentate nitrogen donor ligand and the manganese complex comprises a tridentate or a tetradentate nitrogen donor ligand.

Preferably the iron ion is selected from Fe(II) and Fe(III) and the manganese ion is selected from Mn(II), Mn(III) and Mn (IV).

Preferably the ligand L is present in one or more of the forms such as [MnLCl$_2$], [FeLCl$_2$]; [FeLCl]Cl; [FeL(HH$_2$O)](PF$_6$)$_2$; [FeL]Cl$_2$, [FeLCl]PF$_6$ and [FeL(H$_2$O)](BF$_4$)$_2$. Preferably the ligand L is present in one or more of the forms [MnLCl$_2$], [FeLCl$_2$]; [FeLCl]Cl; [FeL]Cl$_2$ and [FeL(H$_2$O)](BF$_4$)$_2$.

As used herein the term "nitrogen-donor ligand" or "ligand" or "L" is an organic structure or molecule which will support coordinating nitrogen atoms. In the present invention, said at least one nitrogen-donor ligand is selected from the group comprising monodentate, bidentate, tridentate, tetradentate, pentadentate and hexadentate nitrogen donor ligands. For suitable non-limiting examples of monodentate, bidentate, tridentate, tetradentate, pentadentate and hexadentate nitrogen donor ligands reference is made to U.S. Pat. No. 2,526,718, U.S. Pat. No. 2,565,897, U.S. Pat. No. 4,311,625, WO 2008/003652 and DE 4,032,546, the entirety of each of which are hereby incorporated by reference thereto.

Preferably the iron or manganese complex is of a tridentate, tetradentate or pentadentate nitrogen donor ligand. More preferably the iron complex comprises a pentadentate nitrogen donor ligand and the manganese complex comprises a tridentate or a tetradentate nitrogen donor ligand.

The following are preferred classes of metal complexes that are iron or manganese complexes of tridentate, tetradentate, pentadentate or hexadentate nitrogen donor ligands, N-heterocyclic compounds and N-hetero-aromatics.

In a preferred embodiment, said at least one nitrogen donor ligand is selected from the group comprising the compounds of formula (I), (II), (Ill), (IV), (V), (VI), (VII), N-heterocyclic compounds and N-hetero-aromatics:

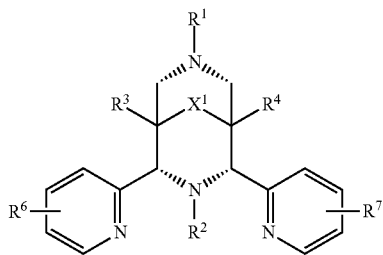 (I)

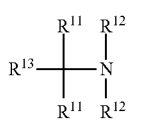 (II)

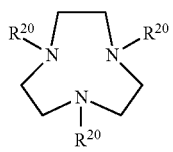 (III)

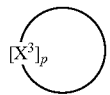 (IV)

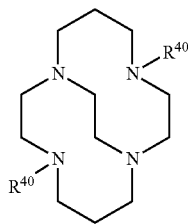 (V)

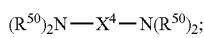 (VI)

 (VII)

wherein $R^1$ and $R^2$ are each independently selected from the group comprising $C_{1-24}$alkyl, $C_{6-12}$aryl, heteroaryl, heteroaryl$C_{1-6}$alkyl, and —$CH_2$—$CH_2$—$N(CH_3)_2$, wherein heteroaryl is selected from the group comprising pyridyl, pyrazinyl, pyrazolyl, pyrrolyl, imidazolyl, benzimidazolyl, pyrimidinyl, triazolyl and thiazolyl;

$R^3$ and $R^4$ are each independently selected from the group comprising —H, $C_{1-8}$alkyl, $C_{1-8}$alkyl-O—$C_{1-8}$alkylene, $C_{1-8}$alkyl-O—$C_{6-12}$arylene, $C_{6-12}$aryl-O—$C_{1-8}$alkylene, $C_{6-12}$aryl, $C_{1-8}$hydroxyalkyl, and —$(CH_2)_m C(O)OR^5$, wherein $R^5$ is selected from —H or $C_{1-4}$alkyl, m is an integer selected from 0 to 4;

each $R^6$ and $R^7$ are independently selected from the group comprising —H, —F, —Cl, —Br, —OH, $C_{1-4}$alkoxy, —NH—C(O)—H, —NH—C(O)—$C_{1-4}$alkyl, —$NH_2$, —NH—$C_{1-4}$alkyl, and $C_{1-4}$alkyl; and, $X^1$ is selected from —C(O)— or —$[C(R^8)_2]_n$— wherein n is an integer selected from 0 to 3, and each $R^8$ is independently selected from the group comprising —H, —OH, $C_{1-4}$alkoxy and $C_{1-4}$alkyl;

$R^{11}$ and $R^{12}$ are each independently a group of formula —$R^{14}$-$R^{15}$;

$R^{13}$ is selected from the group comprising —H, —$R^{14}$-$R^{15}$, and an optionally substituted group selected from the group comprising $C_{1-6}$alkyl, $C_{6-12}$aryl, and $C_{6-12}$aryl$C_{1-6}$alkylene;

each $R^{14}$ is independently selected from a single covalent bond or an optionally substituted group selected from the group comprising $C_{1-6}$alkylene, $C_{2-6}$alkenylene, $C_{1-6}$oxyalkylene, $C_{1-6}$-aminoalkylene, $C_{2-6}$alkylene ether, carboxylic ester and carboxylic amide; and, each $R^{15}$ is independently selected from an optionally N-substituted aminoalkyl group or an optionally substituted heteroaryl group selected from the group comprising pyridyl, pyrazinyl, pyrazolyl, pyrrolyl, imidazolyl, benzimidazolyl, pyrimidinyl, triazolyl and thiazolyl;

each $R^{20}$ is independently selected from the group comprising $C_{1-6}$alkyl, $C_{3-8}$cycloalkyl, heterocycloalkyl, heteroaryl, $C_{6-12}$aryl, and $C_{6-12}$aryl$C_{1-6}$alkylene, optionally substituted with a substituent selected from the group comprising —OH, $C_{1-6}$alkoxy, phenoxy, carboxylate, carboxamide, carboxylic ester, sulfonate, amine, $C_{1-6}$alkylamine and —$N^+(R^{21})_3$;

each $R^{21}$ is selected from the group comprising —H, $C_{1-8}$alkyl, $C_{2-6}$alkenyl, $C_{6-12}$aryl$C_{1-6}$alkylene, $C_{6-12}$aryl$C_{2-6}$alkenylene, $C_{1-8}$alkyloxy, $C_{2-6}$alkenyloxy, amino$C_{1-6}$alkyl, amino$C_{2-6}$alkenyl, $C_{1-6}$alkyl ether, $C_{2-6}$alkenyl ether, and —$CX^2_2$—$R^{22}$;

each $X^2$ is independently selected from —H or $C_{1-3}$alkyl and each $R^{22}$ is independently selected from an optionally substituted heteroaryl group selected from the group comprising pyridyl, pyrazinyl, pyrazolyl, pyrrolyl, imidazolyl, benzimidazolyl, pyrimidinyl, triazolyl and thiazolyl; and, at least one of $R^{21}$ is —$CX^2_2$—$R^{22}$;

each $X^3$ is independently selected from $$—\overset{R^{37}}{\underset{|}{N}}—[CR^{31}R^{32}—CR^{33}R^{34}]— \text{ or}$$

$$—\overset{R^{37}}{\underset{|}{N}}—[CR^{31}R^{32}—CR^{33}R^{34}—CR^{35}R^{36}]—\;;$$

p is 4;

each $R^{37}$ is independently selected from the group comprising —H, $C_{1-8}$alkyl, —$CH_2CH_2OH$, pyridin-2-ylmethyl and —$CH_2C(O)OH$; and, each $R^{31}$, $R^{32}$, $R^{33}$, $R^{34}$, $R^{35}$ and $R^{36}$ are independently selected from the group comprising —H, —$C_{1-4}$alkyl and $C_{1-4}$-hydroxyalkyl;

each $R^{40}$ is independently selected from —H or an optionally substituted group selected from the group comprising $C_{1-20}$alkyl, $C_{1-6}$alkyl$C_{6-12}$arylene, $C_{6-12}$aryl$C_{1-6}$alkylene, $C_{2-6}$alkenyl or $C_{2-6}$-alkynyl;

$X^4$ is selected from —$CH_2CH_2$—, —$CH_2CH_2CH_2$—, —$CH_2C(OH)HCH_2$—;

each $R^{50}$ is independently selected from the group comprising —H, $C_{1-8}$alkyl, $C_{3-8}$cycloalkyl, heterocycloalkyl, heteroaryl, $C_{6-12}$aryl and $C_{6-12}$aryl$C_{1-6}$alkylene, optionally substituted with a substituent selected from the group comprising —OH, $C_{1-6}$alkoxy, phenoxy, carboxylate, carboxamide, carboxylic ester, sulfonate, amine, $C_{1-6}$alkylamine and —$N^+(R^{51})_3$;

each $R^{51}$ is selected from —H, $C_{1-8}$alkyl, $C_{2-6}$alkenyl, $C_{6-12}$aryl$C_{1-6}$alkylene, $C_{6-12}$aryl$C_{2-6}$alkenylene, $C_{1-8}$alkyloxy, $C_{2-6}$alkenyloxy, amino$C_{1-6}$alkyl, amino$C_{2-6}$alkenyl, $C_{1-6}$alkyl ether, $C_{2-6}$alkenyl ether, and —C($X^5$)$_2$—$R^{52}$;

wherein each $X^5$ is independently selected from —H or $C_{1-3}$alkyl and wherein each $R^{52}$ is independently selected from an optionally substituted heteroaryl group selected from the group comprising pyridyl, pyrazinyl, pyrazolyl, pyrrolyl, imidazolyl, benzimidazolyl, pyrimidinyl, triazolyl and thiazolyl; and, at least two of $R^{50}$ are —C($X^5$)$_2$—$R^{52}$; and each $R^{60}$ is independently selected from the group comprising —H, $C_{1-8}$alkyl, $C_{1-6}$hydroxyalkyl, $C_{6-12}$aryl, $C_{1-6}$alkyl$C_{6-12}$arylene, $C_{6-12}$aryl$C_{1-6}$alkylene and $C_{2-6}$alkenyl.

The ligands of formula (I) belong to the bispidon class,

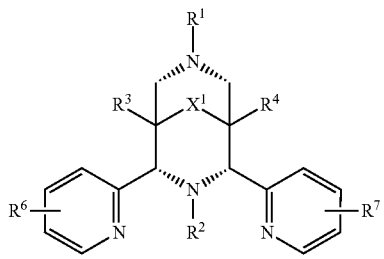

(I)

wherein $R^1$ and $R^2$ are each independently selected from the group comprising $C_{1-24}$alkyl, $C_{6-12}$aryl, heteroaryl, heteroaryl$C_{1-6}$alkyl, and —CH$_2$—CH$_2$—N(CH$_3$)$_2$, wherein heteroaryl is selected from the group comprising pyridyl, pyrazinyl, pyrazolyl, pyrrolyl, imidazolyl, benzimidazolyl, pyrimidinyl, triazolyl and thiazolyl;

$R^3$ and $R^4$ are each independently selected from the group comprising —H, $C_{1-8}$alkyl-O—$C_{6-12}$arylene, $C_{6-12}$aryl-O—$C_{1-8}$alkylene, $C_{6-12}$aryl, $C_{1-8}$hydroxyalkyl, and —(CH$_2$)$_m$C(O)OR$^5$, wherein $R^5$ is selected from —H or $C_{1-4}$alkyl, m is an integer selected from 0 to 4;

each $R^6$ and $R^7$ are independently selected from the group comprising —H, —F, —Cl, —Br, —OH, $C_{1-4}$alkoxy, —NH—C(O)—H, —NH—C(O)—$C_{1-4}$alkyl, —NH$_2$, —NH—$C_{1-4}$alkyl, and $C_{1-4}$alkyl;

$X^1$ is selected from —C(O)— or —[C($R^8$)$_2$]$_n$— wherein n is an integer selected from 0 to 3, and each $R^8$ is independently selected from the group comprising —H, —OH, $C_{1-4}$alkoxy and $C_{1-4}$alkyl;

Preferably $R^3$ and $R^4$ are each independently selected from the group comprising —C(O)—O—CH$_3$, —C(O)—O—CH$_2$—CH$_3$, —C(O)—O—CH$_2$—C$_6$H$_5$ and CH$_2$OH.

Preferably $X^1$ is C=O.

Preferred groups for $R^1$ and $R^2$ are selected from the group comprising CH$_3$, —C$_2$H$_5$, —C$_3$H$_7$, benzyl, —C$_4$H$_9$, —C$_8$H$_{17}$, —C$_{12}$H$_{25}$, and —C$_{18}$H$_{37}$, —CH$_2$-pyridyl, and pyridin-2-yl.

A preferred class of bispidon is one in which at least one of $R^1$ or $R^2$ is pyridin-2-ylmethyl or benzyl, preferably pyridin-2-ylmethyl. More preferably, $R^1$ is pyridin-2-ylmethyl and $R^2$ is methyl.

A preferred bispidon is dimethyl 2,4-di-(2-pyridyl)-3-methyl-7-(pyridin-2-ylmethyl)-3,7-diaza-bicyclo[3.3.1]nonan-9-one-1,5-dicarboxylate (N2py3o-C1) and the iron complex thereof [Fe(N2py3o-C1)Cl]Cl which can be prepared as described in WO 02/48301. Other preferred bispidons are ones in which instead of having a methyl group at the 3 position have longer alkyl chains, namely isobutyl, (n-hexyl) C6, (n-octyl) C8, (n-dodecyl) C12, (n-tetradecyl) C14, (n-octadecyl) C18, which were prepared in an analogous manner. Preferred tetradentate bispidons are also described in WO00/60045 and preferred pentadentate bispidons are described in WO02/48301 and WO03/104379 the entirety of each of which are hereby incorporated by reference.

The ligands of formula (I) are preferably in the form of an iron metal complex.

The ligand of formula (II) is also referred to as "N4py type ligand",

(II)

wherein
$R^{11}$ and $R^{12}$ are each independently a group of formula —$R^{14}$-$R^{15}$;

$R^{13}$ is selected from the group comprising —H, —$R^{14}$-$R^{15}$, and an optionally substituted group selected from the group comprising $C_{1-6}$alkyl, $C_{6-12}$aryl, and $C_{6-12}$aryl$C_{1-6}$alkylene;

each $R^{14}$ is independently selected from a single covalent bond or an optionally substituted group selected from the group comprising $C_{1-6}$alkylene, $C_{2-6}$alkenylene, $C_{1-6}$alkyleneoxy, amino$C_{1-6}$alkylene, $C_{2-6}$alkylene ether, carboxylic ester and carboxylic amide; and, each $R^{15}$ is independently selected from an optionally N-substituted aminoalkyl group or an optionally substituted heteroaryl group selected from the group comprising pyridyl, pyrazinyl, pyrazolyl, pyrrolyl, imidazolyl, benzimidazolyl, pyrimidinyl, triazolyl and thiazolyl.

Preferably $R^{11}$ represents pyridin-2-yl or $R^{12}$ represents pyridin-2-yl-methyl. Preferably $R^{12}$ or $R^{11}$ represents 2-amino-ethyl, 2-(N-(m)ethyl)amino-ethyl or 2-(N,N-di(m)ethyl)amino-ethyl. If substituted, $R^{15}$ preferably represents 3-methylpyridin-2-yl. $R^{13}$ preferably represents hydrogen, benzyl or methyl.

The preferred ligands are N4Py (i.e. N,N-bis(pyridin-2-ylmethyl)-bis(pyridin-2-yl)methylamine) as described in WO95/34628 and MeN4py (i.e. N,N-bis(pyridin-2-yl-methyl-1,1-bis(pyridin-2-yl)-1-aminoethane, as described in EP0909809, the entirety of each of which are hereby incorporated by reference.

The ligands of formula (II) are preferably in the form of an iron metal complex.

The ligand of formula (III) is also referred as the "TACN-Nx" type ligand. The ligands possess the basic 1,4,7-triazacyclononane structure but have one or more pendent nitrogen groups that complex with the metal to provide a tetradentate, pentadentate or hexadentate ligand.

(III)

wherein
each $R^{20}$ is independently selected from the group comprising $C_{1-8}$alkyl, $C_{3-8}$cycloalkyl, heterocycloalkyl, heteroaryl, $C_{6-12}$aryl, and $C_{6-12}$aryl$C_{1-6}$alkylene, optionally substituted with a substituent selected from the group comprising —OH, $C_{1-6}$alkoxy, phenoxy, carboxylate, carboxamide, carboxylic ester, sulfonate, amine, $C_{1-6}$alkylamine and —N$^+$(R$^{21}$)$_3$;

each R$^{21}$ is selected from the group comprising —H, $C_{1-8}$alkyl, $C_{2-6}$alkenyl, $C_{6-12}$aryl$C_{1-6}$alkylene, $C_{6-12}$aryl$C_{2-6}$alkenylene, $C_{1-8}$alkyloxy, $C_{2-6}$alkenyloxy, amino$C_{1-6}$alkyl, amino$C_{2-6}$alkenyl, $C_{1-6}$alkyl ether, $C_{2-6}$alkenyl ether, and —CX$^2_2$—R$^{22}$;

each X$^2$ is independently selected from —H or $C_{1-3}$alkyl and each R$^{22}$ is independently selected from an optionally substituted heteroaryl group selected from the group comprising pyridyl, pyrazinyl, pyrazolyl, pyrrolyl, imidazolyl, benzimidazolyl, pyrimidinyl, triazolyl and thiazolyl; and, wherein at least one of R$^{21}$ is —CX$^2_2$—R$^{22}$.

Preferably R$^{22}$ is selected from optionally substituted pyridin-2-yl, imidazol-4-yl, pyrazol-1-yl, quinolin-2-yl groups. Most preferably R$^{22}$ is either a pyridin-2-yl or a quinolin-2-yl.

Preferably, the basic 1,4,7-triazacyclononane structure has two pendent nitrogen groups that complex with the transition metal (TACN—N2).

In a preferred embodiment, the ligands of formula (III) are in the form of an iron metal complex.

In another embodiment, R$^{20}$=methyl and the metal is Mn.

The ligands of formula (IV) are cyclam ligands,

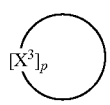
(IV)

wherein each X$^3$ is independently selected from

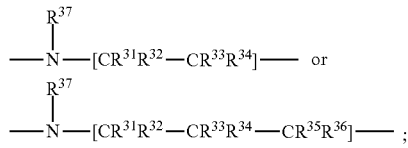

p is 4;

each R$^{37}$ is independently selected from the group comprising —H, $C_{1-6}$alkyl, —CH$_2$CH$_2$OH, pyridin-2-ylmethyl and —CH$_2$C(O)OH; and, each R$^{31}$, R$^{32}$, R$^{33}$, R$^{34}$, R$^{35}$ and R$^{36}$ are independently selected from the group comprising —H, —$C_{1-4}$alkyl and $C_{1-4}$-hydroxyalkyl;

Preferred cyclam ligands are 1,4,8,11-tetraazacyclotetradecane (cyclam), 1,4,8,11-tetramethyl-1,4,8,11-tetraazacyclotetradecane(Me4cyclam), 1,4,7,10-tetraazacyclododecane (cyclen), 1,4,7,10-tetra methyl-1,4,7,10-tetraazacyclododecane (Me4 cyclen), and 1,4,7,10-tetrakis (pyridine-2-ylmethyl)-1,4,7,10-tetraazacyclododecane (Py4 cyclen).

In an embodiment, the ligands of formula (IV) are in the form of an iron metal complex. In another embodiment, the ligands of formula (IV) are in the form of a manganese metal complex. Particularly for the Py4cyclen ligand, the iron complex is preferred.

A preferred cross-bridged ligand is preferably of formula (V),

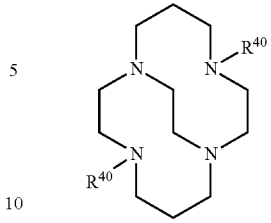
(V)

wherein each R$^{40}$ is independently selected from —H or an optionally substituted group selected from the group comprising $C_{1-20}$alkyl, $C_{1-6}$alkyl$C_{6-12}$arylene, $C_{6-12}$aryl$C_{1-6}$alkylene, $C_{2-6}$alkenyl or $C_{2-6}$-alkynyl;

Preferably R$^{40}$ is methyl, which is the ligand 5,12-dimethyl-1,5,8,12-tetraaza-bicyclo[6.6.2]hexadecane of which the complex [Mn(Bcyclam)Cl$_2$] may be synthesized, as described in WO 98/39098 the entirety of which is hereby incorporated by reference.

Other suitable crossed bridged ligands are also described in WO98/39098 the entirety of which is hereby incorporated by reference.

In an embodiment, the ligands of formula (V) are in the form of an iron metal complex. In another embodiment, the ligands of formula (V) are in the form of a manganese metal complex.

Ligands of formula (VI) are also referred as "trispicentype".

$$(R^{50})_2N—X^4—N(R^{50})_2 \qquad (VI)$$

wherein

X$^4$ is selected from —CH$_2$CH$_2$—, —CH$_2$CH$_2$CH$_2$—, —CH$_2$C(OH)HCH$_2$—;

each R$^{50}$ is independently selected from the group comprising —H, $C_{1-8}$alkyl, $C_{3-8}$cycloalkyl, heterocycloalkyl, heteroaryl, $C_{6-12}$aryl and $C_{6-12}$aryl$C_{1-6}$alkylene, optionally substituted with a substituent selected from the group comprising —OH, $C_{1-6}$alkoxy, phenoxy, carboxylate, carboxamide, carboxylic ester, sulfonate, amine, $C_{1-6}$alkylamine and —N$^+$(R$^{51}$)$_3$;

wherein each R$^{51}$ is selected from the group comprising —H, $C_{1-6}$alkyl, $C_{2-6}$alkenyl, $C_{6-12}$aryl$C_{1-6}$alkylene, $C_{6-12}$aryl$C_{2-6}$alkenylene, $C_{1-6}$alkyloxy, $C_{2-6}$alkenyloxy, amino$C_{1-6}$alkyl, amino$C_{2-6}$alkenyl, $C_{1-6}$alkyl ether, $C_{2-6}$alkenyl ether, and —C(X$^5$)$_2$—R$^{52}$;

wherein each X$^5$ is independently selected from —H or $C_{1-3}$alkyl and wherein each R$^{52}$ is independently selected from an optionally substituted heteroaryl group selected from the group comprising pyridyl, pyrazinyl, pyrazolyl, pyrrolyl, imidazolyl, benzimidazolyl, pyrimidinyl, triazolyl and thiazolyl; and, at least two of R$^{50}$ are —C(X$^5$)$_2$—R$^{52}$.

The heteroatom donor group is preferably pyridinyl optionally substituted by $C_{1-4}$alkyl.

Other preferred heteroatom donor groups are imidazol-2-yl, 1-methyl-imidazol-2-yl, 4-methyl-imidazol-2-yl, imidazol-4-yl, 2-methyl-imidazol-4-yl, 1-methyl-imidazol-4-yl, benzimidazol-2-yl and 1-methyl-benzimidazol-2-yl.

Preferably three of R$^{50}$ are —C(X$^5$)$_2$—R$^{52}$.

The following are preferred trispicens: N-methyl-tris(pyridin-2-ylmethyl)ethylene-1,2-diamine; N-octyl-tris(pyridin-2-ylmethyl)ethylene-1,2-diamine; N-octadecyl-tris(pyridin-2-ylmethyl)ethylene-1,2-diamine; N-methyl-N,N',N'-tris(3-methyl-pyridin-2-ylmethyl)ethylene-1,2-diamine; N-ethyl-N,N',N'-tris(3-methyl-pyridin-2-ylmethyl)ethylene- 1,2-diamine; N-methyl-N,N',N'-tris(5-methyl-pyridin-2-yl-methyl)ethylene-1,2-diamine; N-ethyl-N,N',N'-tris(5-methyl-pyridin-2-ylmethyl)ethylene-1,2-diamine; N-benzyl-N,N',N'-tris(3-methyl-pyridin-2-ylmethyl)ethylene-1,2-diamine; N-benzyl-N,N',N'-tris(5-methyl-pyridin-2-ylmethyl)ethylene-1,2-diamine; N-butyl-N,N',N'-tris(pyridin-2-ylmethyl)ethylene-1,2-diamine; N-octyl-N,N',N'-tris(pyridin-2-ylmethyl)ethylene-1,2-diamine; N-dodecyl-N,N',N'-tris(pyridin-2-ylmethyl)ethylene-1,2-diamine; N-octadecyl-N,N',N'-tris(pyridin-2-ylmethyl)ethylene-1,2-diamine; N-methyl-N,N',N'-Tris(imidazol-2-ylmethyl)-ethylenediamine; N-ethyl-N,N',N'-Tris(imidazol-2-ylmethyl)-ethylenediamine; N,N'-dimethyl-N,N'-bis(imidazol-2-ylmethyl)-ethylenediamine; N-(1-propan-2-ol)-N,N',N'-Tris(imidazol-2-ylmethyl)-ethylenediamine; N-(1-propan-2-ol)-N,N',N'-Tris(1-methyl-imidazol-2-ylmethyl)-ethylenediamine; N,N-diethyl-N',N'',N'''-Tris(5-methyl-imidazol-4-ylmethyl)-diethylenetriamine; N-(3-propan-1-ol)-N,N',N'-Tris(1-methyl-imidazol-2-ylmethyl)-ethylenediamine; N-hexyl-N,N',N'-Tris(imidazol-2-ylmethyl)-ethylenediamine; N-methyl-N,N',N'-tris(benzimidazol-2-ylmethyl)-ethylenediamine; and, N-(3-propan-1-ol)methyl-N,N',N'-tris(benzimidazol-2-ylmethyl)-ethylenediamine. Other suitable trispicens are described in WO 02/077145, which is hereby incorporated by reference in its entirety.

The ligands of formula (VI) are preferably in the form of an iron metal complex.

Other suitable nitrogen donor ligands are ligands of formula (VII)

wherein each $R^{60}$ is independently selected from the group comprising —H, $C_{1-8}$alkyl, $C_{1-6}$hydroxyalkyl, $C_{6-12}$aryl, $C_{1-6}$alkyl$C_{6-12}$arylene, $C_{6-12}$aryl$C_{1-6}$alkylene and $C_{2-6}$alkenyl.

The ligands of formula (VII) are preferably in the form of a manganese metal complex.

In a preferred embodiment, bispidon and TACN-Nx ligands are used. In an embodiment, bispidon and TACN-Nx ligands are used with a Fe metal.

The term "$C_{1-24}$alkyl", as a group or part of a group, refers to a hydrocarbyl radical of Formula $C_nH_{2n+1}$ wherein n is a number ranging from 1 to 24. Generally, the alkyl groups comprise from 1 to 20 carbon atoms, for example 1 to 12 carbon atoms, for example 1 to 6 carbon atoms, for example 1 to 4 carbon atoms. Alkyl groups may be linear, or branched and may be substituted as indicated herein. When a subscript is used herein following a carbon atom, the subscript refers to the number of carbon atoms that the named group may contain. Thus, for example, $C_{1-12}$alkyl means an alkyl of 1 to 12 carbon atoms. Examples of alkyl groups are methyl, ethyl, propyl, isopropyl, butyl, isobutyl, sec-butyl, tert-butyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers.

The term "$C_{2-6}$alkenyl" by itself or as part of another substituent, refers to an unsaturated hydrocarbyl group, which may be linear, or branched, comprising one or more carbon-carbon double bonds. Preferred alkenyl groups thus comprise between 2 and 6 carbon atoms, preferably between 2 and 4 carbon atoms. Non-limiting examples of $C_{2-6}$alkenyl groups include ethenyl, 2-propenyl, 2-butenyl, 3-butenyl, 2-pentenyl and its chain isomers, 2-hexenyl and its chain isomers, 2,4-pentadienyl and the like.

The term "$C_{2-6}$alkynyl" by itself or as part of another substituent, refers to an unsaturated hydrocarbyl group, which may be linear, or branched, comprising one or more carbon-carbon triple bonds. Preferred alkynyl groups thus comprise between 2 and 6 carbon atoms, preferably between 2 and 4 carbon atoms. Non limiting examples of $C_{2-6}$alkynyl groups include ethynyl, 2-propynyl, 2-butynyl, 3-butynyl, 2-pentynyl and its chain isomers, 2-hexynyl and its chain isomers and the like As used herein, the term "$C_{3-8}$cycloalkyl", by itself or as part of another substituent, refers to a saturated or partially saturated cyclic alkyl radical containing from about 3 to about 8 carbon atoms. Examples of $C_{3-8}$cycloalkyl include cyclopropyl, cyclobutyl, cyclopentyl, or cyclohexyl, cycloheptyl and cyclooctyl.

As used herein, the term "$C_{6-12}$aryl", by itself or as part of another substituent, refers to a polyunsaturated, aromatic hydrocarbyl group having a single ring (i.e. phenyl) or multiple aromatic rings fused together (e.g. naphthalene), or linked covalently, typically containing 6 to 12 carbon atoms; wherein at least one ring is aromatic. Examples of $C_{6-12}$aryl include phenyl, naphthyl, indanyl, biphenyl, or 1,2,3,4-tetrahydro-naphthyl.

When the term "alkyl" is used as a suffix following another term, as in "hydroxyalkyl," this is intended to refer to an alkyl group, as defined above, being substituted with one or two (preferably one) substituent(s) selected from the other, specifically-named group, also as defined herein. The term "hydroxyalkyl" therefore refers to a —$R^a$—OH group wherein $R^a$ is alkylene as defined herein.

The term "$C_{1-6}$alkoxy" or "$C_{1-6}$alkyloxy" as used herein refers to a radical having the Formula —$OR^d$ wherein $R^d$ is $C_{1-6}$alkyl. Non-limiting examples of suitable alkoxy include methoxy, ethoxy, propoxy, isopropoxy, butoxy, isobutoxy, sec-butoxy, tert-butoxy, pentyloxy and hexyloxy.

As used herein, the term "$C_{1-12}$alkylene", by itself or as part of another substituent, refers to $C_{1-12}$alkyl groups that are divalent, i.e., with two single bonds for attachment to two other groups. Alkylene groups may be linear or branched and may be substituted as indicated herein. Non-limiting examples of alkylene groups include methylene (—$CH_2$—), ethylene (—$CH_2$—$CH_2$—), methylmethylene (—CH($CH_3$)—), 1-methyl-ethylene (—CH($CH_3$)—$CH_2$—), n-propylene (—$CH_2$—$CH_2$—$CH_2$—), 2-methylpropylene (—$CH_2$—CH($CH_3$)—$CH_2$—), 3-methylpropylene (—$CH_2$—$CH_2$—CH($CH_3$)—), n-butylene (—$CH_2$—$CH_2$—$CH_2$—$CH_2$—), 2-methylbutylene (—$CH_2$—CH($CH_3$)—$CH_2$—$CH_2$—), 4-methylbutylene (—$CH_2$—$CH_2$—$CH_2$—CH($CH_3$)—), pentylene and its chain isomers, hexylene and its chain isomers, heptylene and its chain isomers, octylene and its chain isomers, nonylene and its chain isomers, decylene and its chain isomers, undecylene and its chain isomers, dodecylene and its chain isomers.

The term "$C_{6-12}$aryl$C_{1-6}$alkylene", as a group or part of a group, means a $C_{1-6}$alkyl as defined herein, wherein one or more hydrogen atoms are replaced by a $C_{6-12}$aryl as defined herein. Examples of $C_{6-12}$aryl$C_{1-8}$alkyl radicals include benzyl, phenethyl, dibenzylmethyl, methylphenylmethyl, 3-(2-naphthyl)-butyl, and the like.

As used herein, the term "$C_{1-6}$alkyl$C_{6-12}$arylene", by itself or as part of another substituent, refers to a $C_{6-12}$aryl group as defined herein, wherein a hydrogen atom is replaced by a $C_{1-6}$alkyl as defined herein.

As used herein, the term "$C_{3-6}$cycloalkylene", by itself or as part of another substituent refers to a saturated homocyclic hydrocarbyl biradical of formula $C_nH_{2n-2}$. Non-limiting examples of cycloalkylene include 1,2-cyclopropylene, 1,1- cyclopropylene, 1,1-cyclobutylene, 1,2-cyclobutylene, 1,3-cyclopentylene, 1,1-cyclopentylene, or cyclohexylene.

The term "aminoC$_{1-6}$alkyl", by itself or as part of another substituent, refers to the group —R$^j$—NR$^k$R$^l$ wherein R$^j$ is $_{1-6}$alkylene, R$^k$ is hydrogen or C$_{1-6}$alkyl as defined herein, and R$^l$ is hydrogen or C$_{1-6}$alkyl as defined herein.

The term "C$_{1-6}$alkyl ether" also referred as "C$_{1-6}$ alkoxyC$_{1-6}$ alkyl", by itself or as part of another substituent, refers to an C$_{1-6}$alkyl group substituted with one to two Rb, wherein Rb is C$_{1-8}$alkoxy as defined below.

The term "C$_{2-6}$alkenyl ether" also referred as "C$_{1-6}$alkenyloxyC$_{1-6}$alkenyl", by itself or as part of another substituent, refers to an C$_{1-6}$alkenyl group substituted with one to two R$^e$, wherein R$^e$ is C$_{1-8}$alkenyloxy.

In a preferred embodiment, bispidon and TACN-Nx ligands are used.

Non-limiting examples of preferred nitrogen donor ligands are selected from the group comprising of the compounds of formula (XI), (XII), (XIII), (XIV), (XV),

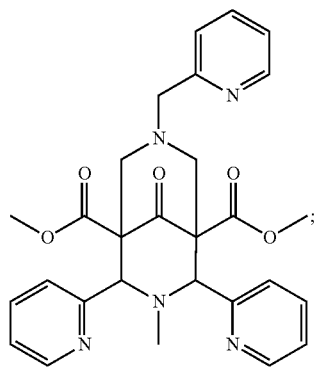
(XI)

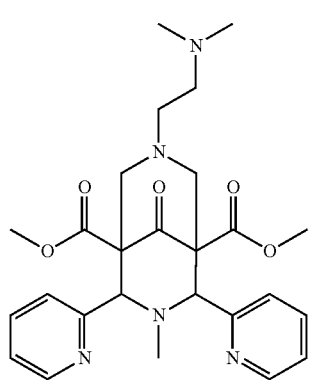
(XII)

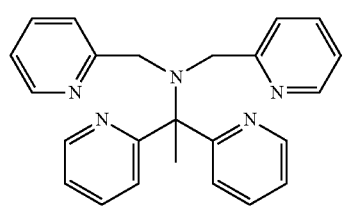
(XII)

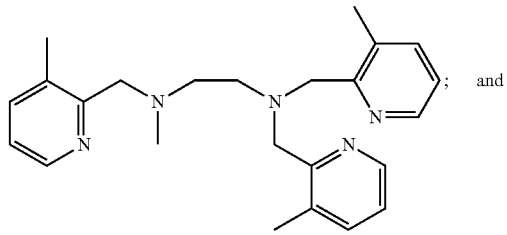
(XIV)

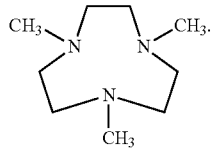
(XV)

Preferably, said iron complex is of formula (XX),

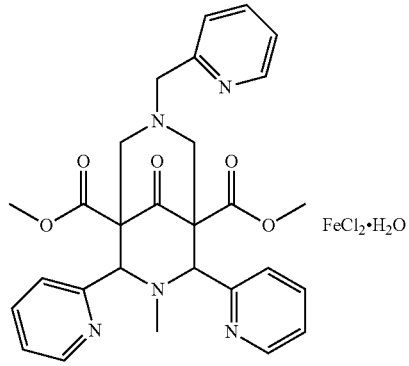
(XX)

which is also referred as the active ingredient of Borchi® Oxy Coat from OMG with CAS nr. 478945-46-9.

Preferably, said manganese complex is of formula (XXI),

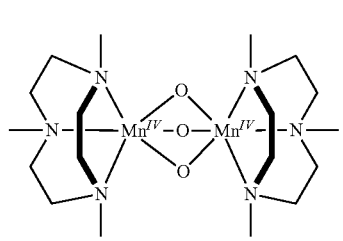
(XXI)

which is also referred as the active ingredient of Drycoat. The manganese complex of formula (XXI) can be provided as a complex of a manganese metal salt of an organic acid, preferably manganese octoate.

In a preferred embodiment, the composition comprises from 0.001 wt % to 10 wt % metal complex of said at least one metal complex, preferably between 0.002 and 5 wt %, more preferably between 0.003 and 1 wt %, with weight percent being based on the total weight of the composition.

In a preferred embodiment, the composition is cobalt free. In a preferred embodiment, the composition is substantially free of cobalt. In a preferred embodiment, the composition is completely free of cobalt. As used herein, the term "substantially free" means that the material being discussed is present in the composition, if at all, as an incidental impurity.

In other words, the material does not affect the properties of the composition. As used herein, the term "completely free" means that the material being discussed is not present in the composition at all. In an embodiment, the composition comprises less than 0.001 wt % cobalt, preferably less than 0.0001 wt % cobalt, more preferably less than 0.00001 wt % cobalt, even more preferably less than 0.000001 wt % cobalt, most preferably less than 0.0000001 wt % cobalt, with weight percentage based on the total weight of binder solids.

According to an embodiment of the invention, the coating composition further comprises at least one metal-based drier system, selected from the group comprising a primary drier, a coordination drier and an auxiliary drier. As used herein, this at least one metal-based drier system is considered separately from and in addition to the at least one metal complex as described above.

As used herein, the term "drier" (which is also referred to synonymously as "siccative" when in solution) refers to organometallic compounds that are soluble in organic solvents and binders. They are added to unsaturated oils and binders in order to appreciably reduce their drying times, i.e. the transition of their films to the solid phase. Driers are available either as solids or in solution. Suitable solvents are organic solvents and binders. The driers are present in amounts expressed as weight percent of the metal based on the weight of binder solids (or resin) unless stated otherwise.

In an embodiment, the drier system comprises a primary drier selected from the group comprising vanadium, iron, manganese, cerium, and lead metal soaps.

In an embodiment, the drier system comprises at least one coordination drier selected from the group comprising zirconium, strontium, aluminum, bismuth, lanthanum, and neodymium metal soaps. In an embodiment, the drier system comprises at least one auxiliary drier selected from the group comprising calcium, barium, potassium and lithium metal soaps.

Preferably, the drier system comprises at least one coordination drier that is a zirconium metal soap and/or at least one auxiliary drier that is a calcium metal soap.

As used herein the term "metal soap" refers to a metal salt of an organic acid. In a preferred embodiment of the invention, the drier system comprises metal salts of an organic acid, for example a calcium salt or a zirconium salt of an organic acid.

Preferably, the organic acid of the metal salt of an organic acid for the drier is selected from branched-chain or straight-chain saturated and unsaturated aliphatic, aromatic and alicyclic monocarboxylic acids having 3 to 22 carbon atoms, cycloaliphatic monocarboxylic acids having 4 to 10 carbon atoms, or mixtures of these acids. Preferably the organic acid is selected from the group comprising: propionic acid, 2-ethylbutanoic acid, 2,2-dimethylpentanoic acid, 2-ethylpentanoic acid, 2-ethyl-4-methylpentanoic acid, 2-ethylhexanoic acid, isooctanoic acid, isononanoic acid, neononanoic acid, nonanoic acid, isodecanoic acid, neodecanoic acid, 2-ethyldecanoic acid, isotridecanoic acid, isotetradecanoic acid, n-hexanoic acid, n-octanoic acid, n-decanoic acid, n-dodecanoic acid, cyclopentanoic acid, methylcyclopentanoic acid, cyclohexanoic acid, methylcyclohexanoic acid, 1,2-dimethylcyclohexanoic acid, cycloheptanoic acid, myristic acid, stearic acid, arachidic acid, behenic acid, oleic acid, linoleic acid, tall oil fatty acid, erucic acid, p-tert-butylbenzoic acid, monobutyl maleate, monodecyl phthalate, naphthenic acid and mixtures thereof. Particularly preferred acids include 2-ethylhexanoic acid, isononanoic acid, isodecanoic acid, and mixtures thereof. Preferably the metal salt of an organic acid is selected from the group comprising metal-octoate, metal-naphthenate and metal-neodecanoate. More preferably, said metal salt of an organic acid is metal-octoate. Preferably, the metal is selected from Mn, Ca or Zr.

In an embodiment, the composition comprises from 0.0001 wt % to 2 wt % metal, preferably from 0.0002 to 0.1 wt % metal, more preferably from 0.0005 to 0.01 wt % metal, considering only the amount of metal of said at least one metal soap, with weight percent being based on the total weight of the alkyd binder. In an embodiment, the composition comprises from 0.0001 wt % to 2 wt % metal, preferably from 0.0002 to 1.5 wt % metal, more preferably from 0.0005 to 1.0 wt % metal, with weight percent being based on the total weight of the alkyd binder, wherein all metal of the composition is included, which comprises the metal of the at least one metal complex as well as the metal of the optional at least one metal drier system.

Examples of suitable calcium (Ca) salts of an organic acid include, but are not limited to: calcium carboxylates such as calcium neodecanoates, calcium octoates, calcium tallates, calcium linoleates, and calcium naphthenates. Such calcium (Ca) driers are available from the OM Group, Inc., and include calcium Ten-Cem®, calcium Cem-All®, calcium Hex-Cem®, and calcium Nap-All.

Examples of suitable zirconium (Zr) salts of an organic acid include, but are not limited to: zirconium carboxylates such as zirconium propionate, zirconium neodecanoates, zirconium octoates, and zirconium naphthenates and mixtures thereof. Such zirconium (Zr) driers are available from the OM Group, Inc., and include zirconium Hex-Cem®.

In an embodiment according to the invention, the composition further comprises an acryloyl based reactive diluent. As used herein, the term "acryloyl" or "(meth)acryloyl" are used interchangeably and refers to a group which comprises at least one acryloyl ($H_2C$=CH—C(=O)—) or methacryloyl ($H_2C$=C($CH_3$)—C(=O)—) group, and thus encompasses both acryloyl and methacryloyl.

In some embodiments according to the invention, the acryloyl based reactive diluent is a monofunctional monomer selected from the group comprising isobornyl(meth)acrylate, bornyl(meth)acrylate, dicyclopentanyl(meth)acrylate, dicyclopentenyl(meth)acrylate, cyclohexyl(meth)acrylate; benzyl(meth)acrylate, 4-butylcyclohexyl(meth)acrylate, (meth) acryloylmorpholine, 2-hydroxyethyl(meth)acrylate, 2-hydroxypropyl(meth)acrylate, 2-hydroxybutyl(meth)acrylate, ethyl(meth)acrylate, propyl(meth)acrylate, isopropyl (meth)acrylate, butyl(meth)acrylate, amyl(meth)acrylate, isobutyl(meth)acrylate, t-butyl(meth)acrylate, pentyl(meth) acrylate, isoamyl(meth)acrylate, hexyl(meth)acrylate, heptyl (meth)acrylate, octyl(meth)acrylate, isooctyl(meth)acrylate, 2-ethylhexyl(meth)acrylate, nonyl(meth)acrylate, decyl (meth)acrylate, isodecyl(meth)acrylate, undecyl(meth)acrylate, dodecyl(meth)acrylate, stearyl(meth)acrylate, isostearyl (meth)acrylate, tetrahydrofurfuryl(meth)acrylate, butoxyethyl(meth)acrylate, ethoxydiethylene glycol(meth) acrylate, phenoxyethyl(meth)acrylate, polyethylene glycol mono(meth)acrylate, polypropylene glycol mono(meth) acrylate, methoxyethylene glycol(meth)acrylate, ethoxyethyl(meth)acrylate, methoxypolyethylene glycol(meth)acrylate, methoxypolypropylene glycol(meth)acrylate, diacetone (meth)acrylamide, isobutoxymethyl(meth)acrylamide, N,N-dimethyl(meth)acrylamide, t-octyl(meth)acrylamide, dimethylaminoethyl(meth)acrylate, diethylaminoethyl (meth)acrylate, 7-amino-3,7-dimethyloctyl(meth)acrylate, N,N-diethyl(meth)acrylamide, N,N-dimethylaminopropyl (meth)acrylamide, oxyethylated phenol acrylate, C12/C14 alkyl methacrylate, C16/C18 alkyl(meth)acrylate, caprolactone acrylate, cyclic trimethylolpropane formal acrylate, ethoxylated (4) nonyl phenol acrylate, poly(propylene glycol) 4-nonylphenyl ether acrylate, octyldecyl acrylate, tridecyl acrylate, and β-carboxyethyl acrylate.

Preferably, the acryloyl based reactive diluent is a monofunctional monomer selected from the group comprising 2(2-ethoxyethoxy)ethylacrylate, 2-phenoxyethyl(meth)acrylate, oxyethylated phenol acrylate, C12/C14 alkyl methacrylate, C16/C18 alkyl(meth)acrylate, caprolactone acrylate, cyclic trimethylolpropane formal acrylate, ethoxylated (4) nonyl phenol acrylate, poly(propylene glycol) 4-nonylphenyl ether acrylate, isobornyl(meth)acrylate, isodecyl acrylate, lauryl acrylate, methoxy polyethylene glycol (350) monomethacrylate, octyldecyl acrylate, polypropylene glycol monomethacrylate, stearyl acrylate, tetrahydrofurfuryl (meth)acrylate, tridecyl acrylate, and β-carboxyethyl acrylate.

In some embodiments of the invention, the acryloyl based reactive diluent is a polyether backbone containing (meth) acrylates represented by the following formula (XVI):

$$CH_2=C(R^{71})COO(R^{72}O)_nR^{73} \qquad (XVI)$$

wherein $R^{71}$ represents hydrogen atom or methyl group, $R^{72}$ represents a $C_{2-6}$alkylene group, preferably a $C_{2-4}$alkylene group; $R^{73}$ represents a hydrogen atom or a $C_{1-12}$alkyl group; and n is an integer selected from 0 to 12.

In some embodiments, the acryloyl based reactive diluent is a bifunctional monomer selected from the group comprising ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, tris(2-hydroxyethyl) isocyanurate di(meth)acrylate, tricyclodecane dimethanol di(meth)acrylate, 1,3-butylene glycol dimethacrylate, ethoxylated 1,6-hexanediol diacrylate, ethoxylated bisphenol A di(meth)acrylate, ethoxylated neopentyl glycol diacrylate, propoxylated neopentyl glycol diacrylate, triethylene glycol di(meth)acrylate, tripropylene glycol diacrylate, di(meth) acrylate of alkylene oxide appended diol of bisphenol A, di(meth)acrylate of alkylene oxide appended diol of hydrogenated bisphenol A, and epoxy(meth)acrylate produced by addition of (meth)acrylate group to diglycidyl ether of bisphenol A.

Preferably the acryloyl based reactive diluent is a bifunctional monomer selected from the group comprising 1,3-butylene glycol dimethacrylate, 1,4-butanediol dimethacrylate, 1,6-hexanediol di(meth)acrylate, ethoxylated 1,6-hexanediol diacrylate, polyethylene glycol di(meth)acrylate, ethoxylated bisphenol A di(meth)acrylate, ethylene glycol dimethacrylate, ethoxylated neopentyl glycol diacrylate, propoxylated neopentyl glycol diacrylate, tetraethylene glycol di(meth)acrylate, tricyclodecane dimethanol di(meth)acrylate, triethylene glycol di(meth)acrylate, and tripropylene glycol diacrylate.

In some embodiments, the acryloyl based reactive diluent is a polyfunctional monomer selected from the group comprising trimethylolpropane tri(meth)acrylate, ethoxylated trimethylolpropane tri(meth)acrylate, ethoxylated pentaerythritol triacrylate, propoxylated trimethylolpropane tri(meth) acrylate, propoxylated glyceryl triacrylate, propoxylated trimethylolpropane triacrylate, pentaerythritol tri(meth)acrylate, pentaerythritol tetra(meth)acrylate, dipentaerythritol hexa(meth)acrylate, ditrimethylolpropane triacrylate, ditrimethylol propane tetra(meth)acrylate, dipentaerythritol pentaacrylate, ethoxylated pentaerythritol tetraacrylate, and tris (2-hydroxy ethyl) isocyanaurate triacrylate.

In an embodiment, the acryloyl based reactive diluent is an admixture of two or more acryloyl based reactive diluents.

Preferably the acryloyl based reactive diluent is a trifunctional monomer selected from the group comprising ethoxylated trimethylolpropane triacrylate, ethoxylated pentaerythritol triacrylate, propoxylated trimethylolpropane triacrylate, propoxylated glyceryl triacrylate, trimethylolpropane tri (meth)acrylate, pentaerythritol triacrylate, propoxylated trimethylolpropane triacrylate, tris(2-hydroxy ethyl) isocyanaurate triacrylate, and ditrimethylolpropane triacrylate.

Preferably the acryloyl based reactive diluent is a monomer with a functionality of 4 or more selected from the group comprising di-trimethylolpropane tetraacrylate, dipentaerythritol pentaacrylate, ethoxylated pentaerythritol tetraacrylate, pentaerythritol tetraacrylate, dipentaerythritol hexaacrylate.

In a preferred embodiment, the acryloyl based reactive diluent is selected from the group comprising trimethylolpropane tri(meth)acrylate (TMPTMA), trimethylolpropane triacrylate (TMPTA), propoxylated neopentyl diacrylate, isobornyl acrylate, ethoxylated trimethylolpropane triacrylate and ditrimethylolpropane tetraacrylate; more preferably from trimethylolpropane tri(meth)acrylate (TMPTMA) and trimethylolpropane triacrylate (TMPTA); most preferably trimethylolpropane tri(meth)acrylate (TMPTMA).

In an embodiment, the acryloyl based reactive diluent is present in an amount of at least 1 wt %, with weight percent being based on the total weight of the composition. Preferably, the acryloyl based reactive diluent is present in an amount of at least 2 wt %, more preferably at least 3 wt %, more preferably at least 4%, most preferably at least 5 wt %, with weight percent being based on the total weight of the composition.

In an embodiment, the acryloyl based reactive diluent is present in an amount of at most 25 wt %, more preferably at most 15 wt %, most preferably at most 6 wt %, with weight percent being based on the total weight of the composition.

In an embodiment according to the invention, the composition further comprises a photo-initiator.

Conventional free radical photoinitiators can be used, including but not limited to benzophenones, acetophenone derivatives, such as alpha-hydroxyalkylphenylketones, alpha-aminoalkylphenylketones, benzoins such as benzoin alkyl ethers and benzyl ketals, phenylglyoxylates, monoacylphosphine oxides, and bisacylphosphine oxides. Free radical initiators are commercially available from, for example, BASF in their DAROCUR and IRGACURE lines; such as IRGACURE 184, IRGACURE 651, and DAROCUR 1173. Suitable initiators also include: acylphosphine oxides such as 2,4,6-trimethylbenzoyl diphenyl phosphine oxide, benzoyldiethoxyphosphine oxide and 2,4,6-trimethylbenzoyl dinaphthyl phosphine oxide, 2,4,6-trimethylbenzoyl ethoxyphenyl phosphine oxide, phenyl bis(2,4,6-trimethylbenzoyl)-phosphine oxide, commercially available as IRGACURE 819; Michler's ketone; benzil; 2-chlorothioxanthone; 2,4-diethylthioxanthone; 2,4-diisopropylthioxanthone; 2-isopropylthioxanthone; 4-isopropylthioxanthone; mixtures of 2-isopropylthioxanthone and 4-isopropylthioxanthone; 2-benzyl-2-(dimethylamino)-1-(4-(4-morpholinyl)phenyl)-1-butanone, commercially available as IRGACURE 369; camphoroquinone and mixtures thereof. Additional initiators include: benzil, acyloin and derivatives thereof, such as benzoin, benzoin methyl ether, benzoin ethyl ether, benzoin isopropyl ether commercially available as VICURE-30 from Stauffer Chemicals, benzoin isobutyl ether commercially available as TRIGONAL-14 from Noury, and methylbenzoin; diketones such as diacetyl; aromatic diketones such as anthraquinone; phenones such as acetophenone, 2,2,2-tribromo-1-phenylethanone, 2,2-diethoxyacetophenone, 2,2-dimethoxy-2-phenylacetophenone commercially available as IRGACURE 651 from BASF, 2,2,2-tribromo-1-(2-nitrophenyl)ethanone, benzophenone, and 4,4-bis(dimethylamino) benzophenone, 2-hydroxy-2-methyl-1-phenyl-propan-1-one commercially available as DAROCUR 1173 from BASF, hydroxycyclohexyl phenyl ketone commercially available as IRGACURE 184 from BASF, 2-methyl-1-(4-(methylthio) phenyl)-2-morpholino-propanoned commercially available as IRGACURE® 907 from BASF, 2,2-dichloro-1-(4 phenoxyphenyl)ethanone commercially available as SANDORAY-1000 from Sandoz, chlorinated benzophenone aryl ketone commercially available as FI-4 from Eastman Kodak, and [alpha]-isobutyl-[alpha]-phenyl acetophenone commercially available as VICURE-10 from Stauffer Chemicals. Visible light initiators include benzil, benzoin, benzoin methyl ether, DL-camphorquinone (CQ), benzil diketones, 6-butoxy-2,4-diiodo-3H-Xanthen-3-one, and acylphosphine oxides.

Preferably, the photo-initiator is selected from the group comprising 2,4,6-trimethylbenzoyl diphenyl phosphine oxide, 2,4,6-trimethylbenzoyl ethoxyphenyl phosphine oxide, phenyl bis(2,4,6-trimethylbenzoyl)-phosphine oxide, benzil (1,2-diphenylethane-1,2-dione). and mixtures of 2-isopropylthioxanthone and 4-isopropylthioxanthone. More preferably, the photo-initiator is selected from phenyl bis(2, 4,6-trimethylbenzoyl)-phosphine oxide and benzil.

In a preferred embodiment, the photo-initiator is selected from bis-acylphosphine oxides (BAPO) or mono-acylphosphines (MAPO). In a preferred embodiment, the photo-initiator is phenyl bis(2,4,6-trimethylbenzoyl)-phosphine oxide, CAS nr. 162881-26-7, which is also known under the trade name of Irgacure® 819.

In an embodiment, the photo-initiator is present in an amount of from about 0.01 to about 5 wt %, with weight percent being based on the total weight of the composition. Preferably, the photo-initiator is present in an amount of from about 0.05 to about 1 wt %, more preferably from about 0.1 to 0.5 wt % with weight percent being based on the total weight of the composition.

In an embodiment, the composition is a solvent-borne composition.

As used herein, the term "solvent-borne composition" refers to a composition that utilizes one or more volatile organic materials as the primary dispersing medium. According to certain embodiments, the compositions of the present invention can be substantially free of water, or, in some cases, completely free of water.

As used herein, the term "volatile organic material" refers to any organic compound having an initial boiling point less than or equal to 250° C. measured at a standard pressure of 101.3 kPa.

As used herein, the term "organic compound" refers to any compound containing at least the element carbon and one or more of hydrogen, oxygen, sulfur, phosphorus, silicon, nitrogen, or a halogen, with the exception of carbon oxides and inorganic carbonates and bicarbonates.

Volatile organic materials are often included in coating compositions to reduce the viscosity of the composition sufficiently to enable forces available in simple coating techniques, such as spraying, to spread the coating to controllable, desired and uniform thicknesses. Also, volatile organic materials may assist in substrate wetting, resinous component compatibility, package stability and film formation. Non-limiting examples of suitable volatile organic materials (also referred as solvent) for use in the present composition include aliphatic, cycloaliphatic, aromatic hydrocarbons and oxygenated solvents, such as hexane, heptane, octane, isooctane, cyclohexane, cycloheptane, toluene and xylene; isoparaffins; ketones, such as methyl ethyl ketone and methyl isobutyl ketone; alcohols, such as isopropyl alcohol, normal-butyl alcohol and normal-propyl alcohol; monoethers of glycols, such as the monoethers of ethylene glycol and diethylene glycol; monoether glycol acetates, such as 2-ethoxyethyl acetate; as well as compatible mixtures thereof. As examples of such solvents may be mentioned hydrocarbon solvents available under the trademarks Shellsol H, Shellsol K, Shellsol D40, Shellsol D60, Shellsol D70, and Shellsol A B, all from Shell Chemicals, the Netherlands, the trademarked Solvesso 150 solvent from Esso and also: Exxsol D40, Exxsol D60 and Exxsol D80, and solvents such as ethyl diglycol, ethyl glycol acetate, butyl glycol, butyl glycol acetate, butyl diglycol, butyl diglycol acetate, methoxypropylene glycol acetate, propylene glycol, propylene glycol mono methyl ether, and dipropylene glycol mono methyl ether.

In certain embodiments, the amount of water present in the compositions of the present invention is less than 25 wt %, such as less than 20 wt %, such as less than 15 wt %, such as less than 10 wt %, such as less than 5 wt %, or, in some cases, less than 2 wt %, or, in yet other cases, less than 1 wt %, with the wt % being based on the total weight of the composition. The amount of water should remain lower than 25 wt % such that the alkyd binder remains in the continuous phase.

In a preferred embodiment, the composition further comprises at least one solvent in an amount of about 0.1 wt % to about 50 wt %, preferably about 1 wt % to about 20 wt %, preferably about 2 wt % to about 10 wt %, based on the total weight of the composition.

In certain embodiments, the composition of the present invention further comprises anti-skinning agents and antioxidants such as but not limited to methyl ethyl ketoxime, n-butyl ketoxime, cyclohexane ketoxime, methyl isobutyl ketoxime, di-methyl ketoxime, 2-cyclohexylphenol, 4-cyclohexylphenol, mono-tertiary butylhydroquinone, diethyl hydroxylamine, 2-[(1-methylpropyl)amino]ethanol, 3-methoxybutyl acetate, triphenyl phosphite, tocopherol, hydroxy acetone, tin octoate, isoascorbic acid, and 2,4-pentadione and the like, and mixtures thereof.

In certain embodiments, the compositions of the present invention comprise at least one colorant. The colorant component of the composition may comprise one or more inorganic or organic, transparent or non-transparent pigments. Non-limiting examples of such pigments are titanium dioxide, iron oxides, mixed metal oxides, bismuth vanadate, chromium oxide green, ultramarine blue, carbon black, lampblack, monoazo and disazo pigments, anthraquinones, isoindolinones, isoindolines, quinophthalones, phthalocyanine blues and greens, dioxazines, quinacridones and diketopyrrolopyrroles; and extender pigments including ground and crystalline silica, barium sulfate, magnesium silicate, calcium silicate, mica, micaceous iron oxide, calcium carbonate, zinc oxide, aluminum hydroxide, aluminum silicate and aluminum silicate, gypsum, feldspar, talcum, kaolin, and the like. The amount of pigment that is used to form the composition is understood to vary, depending on the particular composition application, and can be zero when a clear composition is desired.

For example, a composition may comprise up to about 300 wt %, for example about 50 to about 200 wt % of pigment based on the solids content of the alkyd resin (pigment/binder), preferably up to 100 wt % of pigment based on the solids content of the alkyd resin. Depending on the particular end use, a preferred composition may comprise approximately 0 to 100 wt % of pigment based on the solids content of the alkyd resin.

The compositions of the present invention may include other additives, e.g. catalysts, other pigments and pigment pastes, dyes, fillers, stabilizers, wetting agents, thixotropic agents, anti-sagging agents, anti-oxidants, antifouling agents, bactericides, fungicides, algaecides, anti-settling agents, insecticides, antifoaming agents, slip agents, flow and leveling agents, rheological modifiers, UV-absorbers, HALS-radical scavengers, matting agents, waxes, mineral oils, flame retardants, anti-static agents, loss of dry inhibitors, optical brighteners, adhesion promoters, diluents, elastomers, plasticizers, air release agents, absorbents, anti-crater additives, reinforcing agents, dispersing aids, plasticizers, substrate wetting agents, odorants, electroconductive additives, corrosion inhibitors and corrosion-inhibitive pigments, additional hardeners and additional curable compounds, depending on the application. Certain embodiments of the compositions of the present invention include surface active agents, such as any of the well known anionic, cationic or nonionic surfactants or dispersing agents. Examples of suitable additives that may be added to the composition may be found in Additives Guide, Paint & Coatings Magazine, May 2006, hereby incorporated by reference thereto. If desired, other resinous materials can be utilized in conjunction with the aforementioned alkyd resins.

The metal drier combinations and optionally colorants, pigments and extenders and optionally other additives may be formulated into the compositions by mixing and, if appropriate, dispersing and grinding with the liquid binder.

In a preferred embodiment of the invention, the composition is formulated as a 1K composition, also known as a one-component composition. In a preferred embodiment of the invention, the composition is formulated as a one package composition. The term "one package composition" refers to a stable one package composition, also referred to as a 1K composition or a one-component composition. A 1K or one package composition will be understood as referring to a composition wherein all of the components are maintained in the same container after manufacture, during storage etc. A 2K composition of a multi-component composition, will be understood as referring to a composition wherein various components are maintained separately until just prior to application.

The composition according to the invention can be used and/or formulated as coating, varnish, lacquer, paint, stain, enamel, printing ink or floor covering and similar compositions which contain alkyd binders.

The compositions of the present invention can be applied to various substrates including wood, paper, foam, and synthetic materials (such as plastics including elastomeric substrates), leather, textiles, glass, ceramic, metals (such as iron, steel and aluminum), concrete, cement, brick, and the like.

As a result, the present invention is also directed to substrates at least partially coated with at least one composition of the present invention. The substrates may be pretreated before application of the at least one composition. The substrates may be post-treated after application of the at least one composition, with any other compositions.

Any known method can be used to apply the compositions of the invention to a substrate. Non-limiting examples of such application methods are spreading (e.g., with paint pad or doctor blade, or by brushing or rolling), spraying (e.g., air-fed spray, airless spray, hot spray, and electrostatic spray), flow coating (e.g., dipping, curtain coating, roller coating, and reverse roller coating), and electrodeposition. (See generally, R. Lambourne, Editor, Paint and Surface Coating: Theory and Practice, Eilis Horwood, 1987, page 39 et seq.).

The compositions of the present invention can be applied and fully cured at ambient temperature conditions in the range of from about −10° C. to 50° C. Curing of said polymer composition according to the invention typically can proceed very rapidly, and in general can take place at a temperature within the range of from −10° C. to +50° C., in particular from 0° C. to 40° C., more in particular from 3 to 25° C. However, compositions of the present invention may be cured by additional heating.

The compositions of the present invention may be used as a single coating, a top coating, a base coating in a two-layered system, or one or more layers of a multi-layered system including a clear top coating composition, colorant layer and base coating composition, or as a primer layer. A typical opaque system may comprise: 1 or 2 layers primer and 1 or 2 layers of top coat (a total of 3 layers). Alternative opaque system may comprise: 1 primer layer, 1 layer of mid coat and 1 layer top coat. Example of transparent systems may comprise 1 layer of impregnant and 3 layers of top coats or 3 layers of top coat for maintenance work.

The invention will be more readily understood by reference to the following examples, which are included merely for purpose of illustration of certain aspects and embodiments of the present invention and are not intended to limit the invention.

EXAMPLES

The examples as described hereunder illustrate the effect of the compositions according to embodiments of the present invention on the drying, and are compared with comparative examples.

Unless otherwise indicated, all parts and all percentages in the following examples, as well as throughout the specification, are parts by weight or percentages by weight respectively.

The following test methods were used to evaluate the films and coatings prepared according to the invention.

The drying stages of the paint formulations were assessed using a BK-drying recorder (Sheen Instruments Ltd). A wet paint layer was cast on a glass strip 30.5×2.5 cm by using a sheen cube with a gap size of 150 µm. A vertical blunt needle was positioned into the freshly applied film, loaded by 5 g of brass and then dragged through the drying paint at a speed of 12.2 mm/h in a direction parallel to the length of the coat. A freshly applied alkyd coating is a viscous liquid and the needle penetrated through the coating onto the glass plate and created a score. As the physical drying and autoxidation of the alkyd coating progresses, the viscosity of the drying film rises and the resistance to penetration by the needle increases. During the drying process, the needle created a typical pattern and the various drying stages could be read off from the scribed pattern.

The drying times were determined in terms of four stages, defined as follows:

Run back: the film flows back together when the stylus moves through it and no groove is formed. This phase is characterized by the evaporation of the solvent from the paint.

Continuous track: the film is starting to set up. It does not flow back together after the stylus moves through it, bringing about a groove in the film. In this stage, the viscosity of the paint film has substantially increased. This phase ends when the point of "start of gel tear" is reached.

Gel tear: The stylus rips the surface skin of the film. The film is starting to surface dry but is not through dry.

Surface trace: The stylus leaves a mark on the surface of the film. The phase is characterized by that the film is starting to through dry. At the end of this phase, the resistance becomes total and no further penetration occurs. The alkyd film has reached the status of "through dry".

The coating compositions of the examples according to the invention and of the comparative examples were prepared by grinding in a bead mill the mixture of long oil alkyd (65% nvm), the pigment dispersant and the titanium dioxide followed by the addition of the alkyds, solvent and additives under slow agitation according to the formulations given in the Tables 1 to 4. The dry times were assessed.

Table 1 shows the formulations and the drying times measured for the compositions of examples 1-4 and comparative examples 5-8.

Table 2 shows the formulations and the drying times measured for the compositions of examples 3-4 and comparative examples 9-10.

TABLE 2 coating composition and test results
(quantities given in parts per weight)

|  | example | | comparative example | |
|---|---|---|---|---|
|  | 3 | 4 | 9 | 10 |
| long oil alkyd (65% nvm) | 10.0 | 10.0 | 10.0 | 10.0 |
| pigment dispersant | 0.8 | 0.8 | 0.8 | 0.8 |
| titanium dioxide | 26.0 | 25.9 | 26.0 | 26.0 |
| glycidyl methacrylate (GMA) modified long oil alkyd (85% nvm) | 49.7 | 49.6 | 49.7 | 49.6 |
| TMPTMA | 5.5 | 5.5 | 5.5 | 5.5 |
| high boiling aliphatic hydrocarbon solvent | 2.5 | 2.5 | 2.5 | 2.5 |
| anti-skinning agent | 0.3 | 0.3 | 0.3 | 0.3 |
| calcium (5%) drier | 3.1 | 3.1 | 3.1 | 3.1 |
| zirconium (18%) drier | 1.8 | 1.8 | 1.8 | 1.8 |

TABLE 1 coating composition and test results
(quantities given in parts per weight)

|  | example | | | | comparative example | | | |
|---|---|---|---|---|---|---|---|---|
|  | 1 | 2 | 3 | 4 | 5 | 6 | 7 | 8 |
| long oil alkyd (65% nvm) | 10.6 | 10.6 | 10.0 | 10.0 | 10.6 | 10.6 | 10.0 | 10.0 |
| pigment dispersant | 0.8 | 0.8 | 0.8 | 0.8 | 0.8 | 0.8 | 0.8 | 0.8 |
| titanium dioxide | 27.5 | 27.4 | 26.0 | 25.9 | 27.5 | 27.4 | 26.0 | 25.9 |
| GMA modified long oil alkyd (85% nvm) | 52.6 | 52.4 | 49.7 | 49.6 |  |  |  |  |
| long oil alkyd (85% nvm) |  |  |  |  | 52.6 | 52.4 | 49.7 | 49.6 |
| TMPTMA |  |  | 5.5 | 5.5 |  |  | 5.5 | 5.5 |
| high boiling aliphatic hydrocarbon solvent | 2.6 | 2.6 | 2.5 | 2.5 | 2.6 | 2.6 | 2.5 | 2.5 |
| anti-skinning agent | 0.3 | 0.3 | 0.3 | 0.3 | 0.3 | 0.3 | 0.3 | 0.3 |
| calcium (5%) drier | 3.3 | 3.3 | 3.1 | 3.1 | 3.3 | 3.3 | 3.1 | 3.1 |
| zirconium (18%) drier | 1.9 | 1.9 | 1.8 | 1.8 | 1.9 | 1.9 | 1.8 | 1.8 |
| Nuodex DRYCOAT | 0.3 |  | 0.3 |  | 0.3 |  | 0.3 |  |
| Borchi ® OXY- Coat |  | 0.6 |  | 0.6 |  | 0.6 |  | 0.6 |
| drying times (hours:minutes) at 23° C./50% RH |  |  |  |  |  |  |  |  |
| run back | 3:45 | 1:25 | 3:45 | 0:45 | 6:35 | 5:20 | 7:45 | 5:00 |
| start of gel tear | 3:55 | 1:30 | 4:05 | 0:45 | 7:00 | 5:20 | 7:55 | 5:15 |
| end of gel tear | 7:50 | 9:30 | 6:00 | 3:05 | >24:00 | >24:00 | 12:00 | 9:45 |
| end of surface trace | 15:55 | 13:45 | 6:00 | 3:05 | >24:00 | >24:00 | 13:25 | 9:45 |
| drying times (hours:minutes) at 5° C./80% RH |  |  |  |  |  |  |  |  |
| run back | 0:40 | 1:20 | 3:35 | 2:05 | 1:05 | 1:20 | 9:30 | 7:20 |
| start of gel tear | 4:25 | 3:00 | 4:25 | 2:35 | 10:10 | 7:40 | 10:50 | 8:10 |
| end of gel tear | 6:45 | 9:00 | 6:15 | 5:45 | 18:40 | 16:05 | 14:55 | 14:35 |
| end of surface trace | 12:00 | 21:00 | 6:15 | 6:05 | >24:00 | >24:00 | 16:55 | 19:20 |

The data in Table 1, showed that the coating compositions of examples 1 and 2, comprising the combinations of GMA-modified alkyds and iron- or manganese complexes with nitrogen donor ligands, showed faster drying characteristics, both at room temperature and under adverse conditions, compared to the long oil unmodified alkyd formulations of the coating compositions of comparative examples 5 and 6. Addition of TMPTMA even further increased the drying speed (compositions of examples 3 and 4). Although addition of TMPTMA also increased the drying speed of the long oil unmodified alkyd formulations, as shown for comparative examples 7 and 8, the effect was less pronounced compared to the GMA-modified alkyds.

TABLE 2-continued coating composition and test results
(quantities given in parts per weight)

|  | example | | comparative example | |
|---|---|---|---|---|
|  | 3 | 4 | 9 | 10 |
| Nuodex DRYCOAT | 0.3 |  |  |  |
| Borchi ® OXY- Coat |  | 0.6 |  |  |
| cobalt (10%) drier |  |  | 0.3 |  |
| manganese (10%) drier |  |  |  | 0.4 |

TABLE 2-continued coating composition and test results
(quantities given in parts per weight)

|  | example | | comparative example | |
|---|---|---|---|---|
|  | 3 | 4 | 9 | 10 |
| drying times (hours:minutes) at 23° C./50% RH | | | | |
| run back | 3:45 | 0:45 | 3:00 | 13:15 |
| start of gel tear | 4:05 | 0:45 | 3:10 | 13:15 |
| end of gel tear | 6:00 | 3:05 | 5:00 | 15:20 |
| end of surface trace | 6:00 | 3:05 | 7:00 | 19:25 |
| drying times (hours:minutes) at 5° C./80% RH | | | | |
| run back | 3:35 | 2:05 | 9:00 | >24:00 |
| start of gel tear | 4:25 | 2:35 | 9:00 | >24:00 |
| end of gel tear | 6:15 | 5:45 | 12:30 | >24:00 |
| end of surface trace | 6:15 | 6:05 | 15:30 | >24:00 |

The results in Table 2 display that compositions containing the driers Nuodex Drycoat and Borchi® OXY-Coat showed faster curing times, especially at low temperatures. Surprisingly, these drying results demonstrated that driers based on iron- and manganese ligand complexes were more suitable for alkyds containing pendant acryloyl moieties than cobalt and ligand-free manganese driers.

Table 3 shows the formulations and the drying times measured for the compositions of example 11 and comparative example 12.

TABLE 3 coating composition and test results
(quantities given in parts per weight)

|  | example 11 | comparative example 12 |
|---|---|---|
| long oil alkyd (65% nvm) | 10.0 | 10.0 |
| pigment dispersant | 0.8 | 0.8 |
| titanium dioxide | 25.8 | 25.8 |
| glycidyl methacrylate (GMA) modified long oil alkyd (85% nvm) | 49.6 | 49.7 |
| TMPTMA | 5.4 | 5.5 |
| Irgacure 819 | 0.2 | 0.2 |
| high boiling aliphatic hydrocarbon solvent | 2.4 | 2.5 |
| anti-skinning agent | 0.3 | 0.3 |
| calcium (5%) drier | 3.1 | 3.1 |
| zirconium (18%) drier | 1.8 | 1.8 |
| Borchi ® OXY- Coat | 0.6 |  |
| cobalt (10%) drier |  | 0.3 |
| drying times (hours:minutes) at 5° C./80% RH in daylight | | |
| run back | 1:30 | 2:35 |
| start of gel tear | 2:00 | 2:45 |
| end of gel tear | 4:40 | 5:30 |
| end of surface trace | 5:00 | 7:55 |
| drying times (hours:minutes) at 5° C./80% RH in the dark | | |
| run back | 2:55 | 19:35 |
| start of gel tear | 3:35 | 19:35 |
| end of gel tear | 6:15 | 23:00 |
| end of surface trace | 6:15 | >24:00 |

The results presented in table 3 clearly indicate that the composition of example 11 dried fast under conditions of 5° C. and 80% RH both in light as well as in the dark. In contrast, the drying times of composition of comparative example 12 in the absence of light were substantially longer compared to curing in daylight. The drying times of the compositions according to the present invention were less sensitive to the light intensity than cobalt containing formulations. This indicated that the curing mechanism of acryloyl functionalized alkyds catalyzed by driers based on iron- and manganese ligand complexes may be different from that of cobalt carboxylates.

Table 4 shows the formulations and the drying times measured for the compositions of examples 13-14 and comparative examples 15-16.

TABLE 4 coating composition and test results
(quantities given in parts per weight)

|  | example | | comparative example | |
|---|---|---|---|---|
|  | 14 | 15 | 16 | 17 |
| long oil alkyd (65% nvm) | 10.5 | 9.9 | 10.5 | 9.9 |
| pigment dispersant | 0.8 | 0.8 | 0.8 | 0.8 |
| titanium dioxide | 27.1 | 25.6 | 27.2 | 25.7 |
| glycidyl methacrylate (GMA) modified long oil alkyd (99% nvm) | 52.0 | 49.1 | 52.2 | 49.3 |
| TMPTMA |  | 5.4 |  | 5.4 |
| Irgacure 819 |  | 0.1 |  | 0.1 |
| high boiling aliphatic hydrocarbon solvent | 2.6 | 2.5 | 2.6 | 2.5 |
| anti-skinning agent | 0.4 | 0.3 | 0.4 | 0.3 |
| calcium (5%) drier | 3.7 | 3.5 | 3.7 | 3.5 |
| zirconium (18%) drier | 2.2 | 2.1 | 2.2 | 2.1 |
| Borchi ® OXY- Coat | 0.7 | 0.7 |  |  |
| cobalt (10%) drier |  |  | 0.4 | 0.3 |
| drying times (hours:minutes) at 5° C./80% RH in daylight | | | | |
| run back | 5:30 | 3:25 | 19:30 | 6:25 |
| start of gel tear | 5:35 | 3:25 | 19:30 | 6:45 |
| end of gel tear | 11:30 | 5:30 | >24:00 | 11:35 |
| end of surface trace | 12:10 | 6:25 | >24:00 | 11:35 |
| drying times (hours:minutes) at 5° C./80% RH in the dark | | | | |
| run back | 15:45 | 14:20 | >24:00 | >24:00 |
| start of gel tear | 15:45 | 15:10 | >24:00 | >24:00 |
| end of gel tear | 22:00 | 16:45 | >24:00 | >24:00 |
| end of surface trace | 22:00 | 17:55 | >24:00 | >24:00 |
| drying times (hours:minutes) at 23° C./50% RH in daylight | | | | |
| run back | 3:50 | 2:05 | 8:20 | 4:10 |
| start of gel tear | 4:00 | 2:05 | 8:20 | 4:10 |
| end of gel tear | 9:25 | 4:45 | 10:25 | 5:35 |
| end of surface trace | 9:25 | 4:45 | 11:40 | 5:35 |
| drying times (hours:minutes) at 23° C./50% RH in the dark | | | | |
| run back | 7:30 | 8:45 | 17:45 | 15:40 |
| start of gel tear | 7:35 | 8:45 | 17:45 | 15:40 |
| end of gel tear | 14:50 | 11:00 | 19:05 | 17:00 |
| end of surface trace | 14:50 | 11:00 | 20:00 | 17:00 |

The results in table 4 show that low VOC formulations according to the present invention showed short drying times. The VOC-content of the compositions of examples 13, 14, and comparative examples 15 and 16 was between 110 and 120 g/L. Notwithstanding the high solids content, the examples 13 and 14 dried fast even under adverse conditions.

Table 5 shows the formulations and the drying times measured for the compositions of examples 24, 26, 28 and comparative examples 18-23, 24, 25, 27, 29.

TABLE 5 coating composition and test results
(quantities given in parts per weight)

|  | comparative example 18 | comparative example 19 | comparative example 20 | comparative example 21 | comparative example 22 | comparative example 23 | example 24 | comparative example 25 | example 26 | comparative example 27 | example 28 | comparative example 29 |
|---|---|---|---|---|---|---|---|---|---|---|---|---|
| long oil alkyd (84% nvm) | 47.5 | 47.5 | | | | | | | | | | |
| long oil alkyd (80% nvm) | | | 20.1 | 20.1 | 41.4 | 41.9 | | | | | | |
| long oil alkyd (65% nvm) | | | | | | | 10.6 | 10.6 | 10.6 | 10.6 | 10.6 | 10.6 |
| thixotropic alkyd (65% nvm) | | | 16.0 | 16.0 | | | | | | | | |
| PU-modified alkyd binder (57% nvm) | 16.0 | 16.0 | | | | | | | | | | |
| glycidyl methacrylate (GMA) modified long oil alkyd-1 (85% nvm) | | | | | | | 52.5 | 52.7 | | | | |
| glycidyl methacrylate (GMA) modified long oil alkyd-2 (85% nvm) | | | | | | | | | 52.5 | 52.7 | | |
| glycidyl methacrylate (GMA) modified long oil alkyd-3 (85% nvm) | | | | | | | | | | | 52.5 | 52.7 |
| pigment dispersant | 0.7 | 0.7 | 0.4 | 0.4 | 1.0 | 1.0 | 0.8 | 0.8 | 0.8 | 0.8 | 0.8 | 0.8 |
| titanium dioxide | 23.5 | 23.5 | 26.1 | 26.1 | 24.2 | 24.6 | 27.4 | 27.5 | 27.4 | 27.5 | 27.4 | 27.5 |
| silicate | | | 24.1 | 24.1 | 16.4 | 14.6 | | | | | | |
| defoamer | 0.2 | 0.2 | | | 0.3 | 0.3 | | | | | | |
| high boiling aliphatic hydrocarbon solvent | 5.4 | 5.4 | 10.8 | 10.8 | 8.5 | 10.4 | 2.6 | 2.6 | 2.6 | 2.6 | 2.6 | 2.6 |
| anti-skinning agent | 0.4 | 0.4 | 0.8 | 0.8 | 0.6 | 0.6 | 0.3 | 0.3 | 0.3 | 0.3 | 0.3 | 0.3 |
| calcium (5%) drier | 4.0 | 4.0 | 0.9 | 0.9 | 3.9 | 4.0 | 3.3 | 3.3 | 3.3 | 3.3 | 3.3 | 3.3 |
| zirconium (18%) drier | 2.1 | 2.1 | 0.5 | 0.5 | 3.1 | 2.3 | 1.9 | 1.9 | 1.9 | 1.9 | 1.9 | 1.9 |
| Borchi ® OXY- Coat | 0.2 | | 0.3 | | 0.6 | | 0.6 | | 0.6 | | 0.6 | |
| cobalt (10%) drier | | 0.2 | | 0.3 | | 0.3 | | 0.3 | | 0.3 | | 0.3 |
| drying times (hours:minutes) at 23° C./ 50% RH in daylight | | | | | | | | | | | | |
| run back | 1:40 | 1:20 | 0:30 | 0:30 | 1:30 | 0:30 | 1:45 | 7:30 | 1:15 | 7:00 | 3:00 | 12:45 |
| start of gel tear | 2:10 | 1:20 | 2:30 | 1:20 | 7:00 | 1:30 | 1:45 | 7:30 | 1:15 | 7:00 | 3:05 | 12:45 |
| end of gel tear | 8:40 | 7:50 | 5:40 | 2:30 | 12:15 | 3:00 | 7:25 | 16:15 | 8:55 | 16:35 | 11:15 | 20:25 |
| end of surface trace | >24:00 | 9:00 | 6:20 | 3:00 | 14:15 | 4:00 | 18:50 | >24:00 | 11:05 | >24:00 | 12:45 | >24:00 |

The results in table 5 show that formulations based on long oil alkyds without pendant ethylenically unsaturated groups dry faster in the presence of cobalt driers compared to Borchi Oxy Coat (comparative examples 18-23). These comparative examples show three different formulations based on PU-modified alkyds, thixotropic polyamide modified alkyds and long oil alkyds having a range of PVC values (pigment volume concentrations). In the examples and comparative examples 24-29, it is shown that Borchi Oxy Coat is more reactive than the cobalt drier in formulations containing GMA-modified alkyds (exemplified by 3 different GMA/modified alkyds). Examples and comparative examples 24-29 show the surprising synergistic effect between the (meth)acrylate modified alkyd binder and the metal complex.

It is to be understood that although preferred embodiments and/or materials have been discussed for providing embodiments according to the present invention, various modifications or changes may be made without departing from the scope and spirit of this invention.

The invention claimed is:

1. A composition comprising:
 (a) at least one modified alkyd binder, selected from a (meth)acrylate modified alkyd binder and a vinyl modified alkyd binder, wherein the (meth)acrylate modified alkyd and the vinyl modified alkyd binder comprise at least one —$C(R^{100})$=$CH_2$ group, wherein $R^{100}$ is hydrogen or methyl; and
 (b) at least one metal complex comprising a metal or a metal salt of an organic acid or inorganic anion and at least one ligand, wherein the metal is selected from Fe and Mn, and wherein said at least one ligand is a nitrogen donor ligand, selected from monodentate, bidentate, tridentate, tetradentate, pentadentate and hexadentate nitrogen donor ligands.

2. The composition according to claim 1, wherein said nitrogen donor ligand is selected from the compounds of formula (I), (II), (III), (IV), (V), (VI), (VII), N-heterocyclic compounds and N-hetero-aromatics:

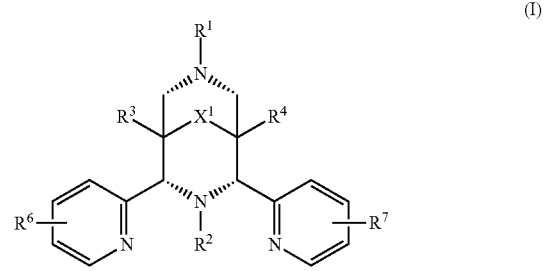

(I)

-continued

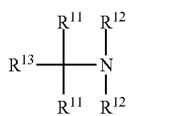
(II)

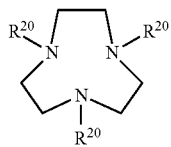
(III)

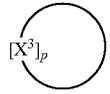
(IV)

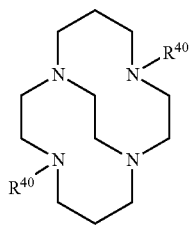
(V)

$(R^{50})_2N-X^4-N(R^{50})_2;$ (VI)

$N(R^{60})_3;$ (VII)

wherein
  $R^1$ and $R^2$ are each independently selected from $C_{1-24}$alkyl, $C_{6-12}$aryl, heteroaryl, heteroaryl$C_{1-6}$alkyl, and —$CH_2CH_2N(CH_3)_2$, wherein heteroaryl is selected from pyridyl, pyrazinyl, pyrazolyl, pyrrolyl, imidazolyl, benzimidazolyl, pyrimidinyl, triazolyl and thiazolyl;
  $R^3$ and $R^4$ are each independently selected from —H, $C_{1-8}$alkyl, $C_{1-8}$alkyl-O—$C_{1-8}$alkylene, $C_{1-8}$alkyl-O—$C_{6-12}$arylene, $C_{6-12}$aryl-O—$C_{1-8}$alkylene, $C_{6-12}$aryl, $C_{1-8}$hydroxyalkyl, and —$(CH_2)_mC(O)OR^5$, wherein $R^5$ is selected from —H or $C_{1-4}$alkyl, m is an integer selected from 0 to 4;
  each $R^6$ and $R^7$ are independently selected from —H, —F, —Cl, —Br, —OH, $C_{1-4}$alkoxy, —NH—C(O)—H, —NH—C(O)—$C_{1-4}$alkyl, —$NH_2$, —NH—$C_{1-4}$alkyl, and $C_{1-4}$alkyl; and,
  $X^1$ is selected from —C(O)— or —$[(C(R^8)]_n$—; wherein n is an integer selected from 0 to 3, and each $R^8$ is independently selected from —H, —OH, $C_{1-4}$ alkoxy and $C_{1-4}$alkyl;
  $R^{11}$ and $R^{12}$ are each independently a group of formula —$R^{14}$-$R^{15}$;
  $R^{13}$ is selected from —H, —$R^{14}$-$R^{15}$, and an optionally substituted group selected from $C_{1-5}$alkyl, $C_{6-12}$aryl, and $C_{6-12}$aryl$C_{1-6}$ alkylene;
  each $R^{14}$ is independently selected from a single covalent bond or an optionally substituted group selected from $C_{1-6}$alkylene, $C_{2-6}$alkenylene, $C_{1-6}$ oxyalkylene, $C_{1-6}$aminoalkylene, $C_{2-6}$alkylene ether, carboxylic ester and carboxylic amide; and,
  each $R^{15}$ is independently selected from an optionally N-substituted aminoalkyl group or an optionally substituted heteroaryl group selected from pyridyl, pyrazinyl, pyrazolyl, pyrrolyl, imidazolyl, benzimidazolyl, pyrimidinyl, triazolyl and thiazolyl;

each $R^{20}$ is independently selected from $C_{1-6}$alkyl, $C_{3-8}$cycloalkyl, heterocycloalkyl, heteroaryl, $C_{6-12}$aryl, and $C_{6-12}$aryl$C_{1-6}$alkylene, optionally substituted with a substituent selected from —OH, $C_{1-6}$alkoxy, phenoxy, carboxylate, carboxamide, carboxylic ester, sulfonate, amine, $C_{1-6}$alkylamine, and —$N^+(R^{21})_3$—;
  each $R^{21}$ is selected from —H, $C_{1-6}$alkyl, $C_{2-6}$alkenyl, $C_{6-12}$aryl $C_{1-6}$alkylene, $C_{6-12}$aryl$C_{2-6}$alkenylene, $C_{1-6}$alkyloxy, $C_{2-6}$alkenyloxy, amino$C_{1-6}$alkyl, amino$C_{2-6}$alkenyl, $C_{1-6}$alkyl ether, $C_{2-6}$alkenyl ether, and —$CX^2_2$—$R^{22}$;
  each $X^2$ is independently selected from —H or $C_{1-3}$alkyl and each $R^{22}$ is independently selected from an optionally substituted heteroaryl group selected from pyridyl, pyrazinyl, pyrazolyl, pyrrolyl, imidazolyl, benzimidazolyl, pyrimidinyl, triazolyl and thiazolyl; and,
  at least one of $R^{21}$ is $CX^2_2$—$R^{22}$,
  each $X^3$ is independently selected from

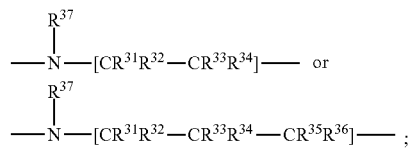

p is 4;
  each $R^{37}$ is independently selected from —H, $C_{1-6}$alkyl, —$CH_2CH_2OH$, pyridin-2-ylmethyl and —$CH_2C(O)OH$; and,
  each $R^{31}$, $R^{32}$, $R^{33}$, $R^{34}$, $R^{35}$ and $R^{36}$ is independently selected from —H, $C_{1-4}$alkyl, and $C_{1-4}$ hydroxyalkyl;
  each $R^{40}$ is independently selected from —H or an optionally substituted group selected from $C_{1-20}$alkyl, $C_{1-6}$alkyl$C_{6-12}$arylene, $C_{6-12}$aryl$C_{1-6}$alkylene, $C_{2-6}$alkenyl or $C_{2-6}$-alkynyl; and all nitrogen atoms in the macropolycyclic rings are coordinated with the transition metal;
  $X^4$ is selected from —$CH_2CH_2$—, —$CH_2CH_2CH_2$—, —$CH_2C(OH)HCH_2$—;
  each $R^{50}$ is independently selected from —H, $C_{1-6}$alkyl, $C_{3-8}$cycloalkyl, heterocycloalkyl, heteroaryl, $C_{6-12}$aryl and $C_{6-12}$aryl$C_{1-6}$alkylene, optionally substituted with a substituent selected from —OH, $C_{1-6}$alkoxy, phenoxy, carboxylate, carboxamide, carboxylic ester, sulfonate, amine, $C_{1-6}$alkylamine and —$N^+(R^{51})_3$;
  each $R^{51}$ is selected from —H, $C_{1-6}$alkyl, $C_{2-6}$alkenyl, $C_{6-12}$aryl$C_{1-6}$alkylene, $C_{6-12}$aryl$C_{2-6}$alkenylene, $C_{1-6}$alkyloxy, $C_{2-6}$alkenyloxy, amino$C_{1-6}$alkyl, amino$C_{2-6}$alkenyl, $C_{1-6}$alkyl ether, $C_{2-6}$alkenyl ether, and —$C(X^5)_2$—$R^{52}$; wherein each $X^5$ is independently selected from —H or $C_{1-3}$alkyl and wherein each $R^{52}$ is independently selected from an optionally substituted heteroaryl group selected from pyridyl, pyrazinyl, pyrazolyl, pyrrolyl, imidazolyl, benzimidazolyl, pyrimidinyl, triazolyl and thiazolyl; and,
  at least two of $R^{50}$ are —$C(X^5)_2$—$R^{52}$; and
  each $R^{60}$ is independently selected from —H, $C_{1-6}$alkyl, $C_{6-12}$aryl, $C_{1-6}$alkyl$C_{6-12}$arylene, $C_{6-12}$aryl$C_{1-6}$alkylene and $C_{2-6}$alkenyl.

3. The composition according to claim 1, wherein said nitrogen donor ligand is selected from the compounds of formula (XI), (XII), (XIII), (XIV), and (XV), (XI)
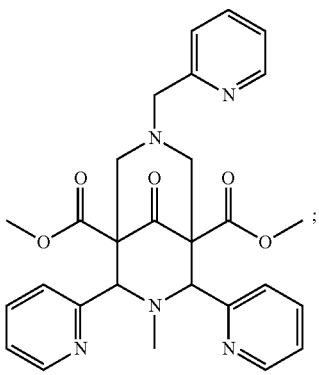

(XII)
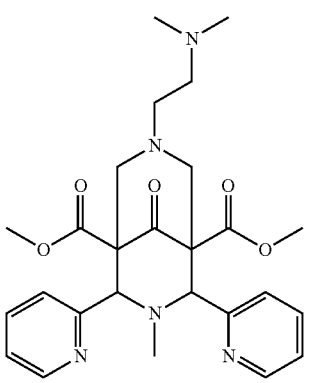

(XIII)
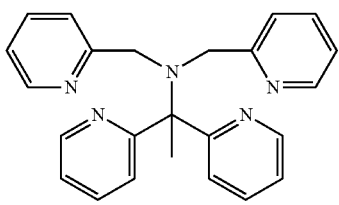

(XIV)
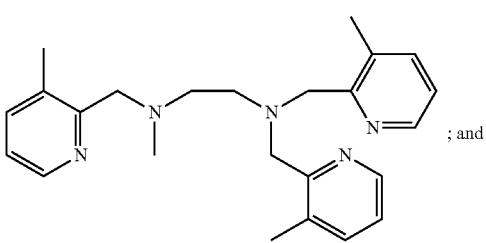
; and (XV)
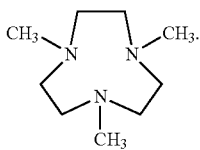

4. The composition according to claim 1, wherein said composition is cobalt free.

5. The composition according to claim 1, comprising from 0.001 wt % to 10 wt % metal complex of said at least one metal complex, with weight percent being based on the total weight of the composition.

6. The composition according to claim 1, wherein said at least one (meth)acrylate or vinyl modified alkyd binder is present in an amount of from about 20 wt % to about 98 wt %, with weight percent being based on the total weight of the composition.

7. The composition according to claim 1, further comprising at least one alkyd binder comprising a medium oil alkyd binder, a long oil alkyd binder, a very long oil alkyd binder, or a combination thereof.

8. The composition according to claim 1, further comprising at least one metal-based drier system, wherein the drier system comprises at least one coordination drier selected from zirconium, strontium, aluminum, bismuth, lanthanum, and neodymium metal soaps, and wherein the drier system optionally comprises at least one auxiliary drier selected from calcium, barium, potassium and lithium metal soaps.

9. The composition according to claim 1, further comprising an acryloyl based reactive diluent.

10. The composition according to claim 9, wherein the acryloyl based reactive diluent is selected from a monofunctional monomer selected from isobornyl(meth)acrylate, bornyl(meth)acrylate, dicyclopentanyl(meth)acrylate, dicyclopentenyl(meth)acrylate, cyclohexyl(meth)acrylate; benzyl(meth)acrylate, 4-butylcyclohexyl(meth)acrylate, (meth)acryloylmorpholine, 2-hydroxyethyl(meth)acrylate, 2-hydroxypropyl(meth)acrylate, 2-hydroxybutyl(meth)acrylate, ethyl(meth)acrylate, propyl(meth)acrylate, isopropyl(meth)acrylate, butyl(meth)acrylate, amyl(meth)acrylate, isobutyl(meth)acrylate, t-butyl(meth)acrylate, pentyl(meth)acrylate, isoamyl(meth)acrylate, hexyl(meth)acrylate, heptyl(meth)acrylate, octyl(meth)acrylate, isooctyl(meth)acrylate, 2-ethylhexyl(meth)acrylate, nonyl(meth)acrylate, decyl(meth)acrylate, isodecyl(meth)acrylate, undecyl(meth)acrylate, dodecyl(meth)acrylate, stearyl(meth)acrylate, isostearyl(meth)acrylate, tetrahydrofurfuryl(meth)acrylate, butoxyethyl(meth)acrylate, ethoxydiethylene glycol(meth)acrylate, phenoxyethyl(meth)acrylate, polyethylene glycol mono(meth)acrylate, polypropylene glycol mono(meth)acrylate, methoxyethylene glycol(meth)acrylate, ethoxyethyl(meth)acrylate, methoxypolyethylene glycol(meth)acrylate, methoxypolypropylene glycol(meth)acrylate, diacetone (meth)acrylamide, isobutoxymethyl(meth)acrylamide, N,N-dimethyl(meth)acrylamide, t-octyl(meth)acrylamide, dimethylaminoethyl(meth)acrylate, diethylaminoethyl(meth)acrylate, 7-amino-3,7-dimethyloctyl(meth)acrylate, N,N-diethyl(meth)acrylamide, N,N-dimethylaminopropyl(meth)acrylamide, oxyethylated phenol acrylate, C12/C14 alkyl methacrylate, C16/C18 alkyl(meth)acrylate, caprolactone acrylate, cyclic trimethylolpropane formal acrylate, ethoxylated (4) nonyl phenol acrylate, poly(propylene glycol) 4-nonylphenyl ether acrylate, octyldecyl acrylate, tridecyl acrylate, and 13-carboxyethyl acrylate; a bifunctional monomer selected from ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, tris(2-hydroxyethyl) isocyanurate di(meth)acrylate, tricyclodecane dimethanol di(meth)acrylate, 1,3-butylene glycol dimethacrylate, ethoxylated 1,6-hexanediol diacrylate, ethoxylated bisphenol A di(meth)acrylate, ethoxylated neopentyl glycol diacrylate, propoxylated neopentyl glycol diacrylate, triethylene glycol di(meth)acrylate, tripropylene glycol diacrylate, di(meth)acrylate of alkylene oxide appended diol of bisphenol A, di(meth)acrylate of alkylene oxide appended diol of hydrogenated bisphenol A, and epoxy (meth)acrylate produced by addition of (meth)acrylate group to diglycidyl ether of bisphenol A; a polyfunctional monomer selected from trimethylolpropane tri(meth)acrylate, ethoxylated trimethylolpropane tri(meth)acrylate, ethoxylated pentaerythritol triacrylate, propoxylated trimethylolpropane tri(meth)acrylate, propoxylated glyceryl triacrylate, propoxylated trimethylolpropane triacrylate, tri(meth)acrylate, pentaerythritol tetra(meth)acrylate, di pentaerythritol hexa(meth)acrylate, ditrimethylolpropane triacrylate, ditrimethylol propane tetra(meth)acrylate, dipentaerythritol pentaacrylate, ethoxylated pentaerythritol tetraacrylate, and tris(2-hydroxy ethyl) isocyanaurate triacrylate; and a polyether backbone comprising (meth)acrylate of formula (XVI):

$$CH_2=C(R^{71})COO(R^{72}O)_nR^{73} \qquad (XVI)$$

wherein $R^{71}$ represents hydrogen atom or methyl group, $R^{72}$ represents a $C_{2-6}$alkylene group; $R^{73}$ represents a hydrogen atom or a $C_{1-12}$alkyl group; and n is an integer selected from 0 to 12; or an admixture of two or more acryloyl based reactive diluents.

11. The composition according to claim 9, wherein the acryloyl based reactive diluent is present in an amount of at least 1 wt %, with weight percent being based on the total weight of the composition.

12. The composition according to claim 1, further comprising a photo-initiator selected from the bis-acylphosphine oxides (BAPO) and mono-acylphosphines (MAPO), and wherein the photo-initiator is present in an amount of from about 0.01 to about 5 wt %, with weight percent being based on the total weight of the composition.

13. The composition according to claim 1, wherein said composition is formulated as a one package composition.

14. The composition according to claim 1, wherein said composition is a solvent-borne composition.

15. Use of the composition according to claim 1 in a coating, varnish, lacquer, paint, stain, enamel, printing ink or floor covering.

* * * * *